United States Patent
Sugimoto

(10) Patent No.: US 8,049,810 B2
(45) Date of Patent: Nov. 1, 2011

(54) IMAGING APPARATUS AND METHOD

(75) Inventor: Masahiko Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 396 days.

(21) Appl. No.: 12/263,801

(22) Filed: Nov. 3, 2008

(65) Prior Publication Data

US 2009/0115887 A1     May 7, 2009

(30) Foreign Application Priority Data

Nov. 2, 2007  (JP) .................. 2007-286250

(51) Int. Cl.
G03B 13/00 (2006.01)
H04N 5/232 (2006.01)

(52) U.S. Cl. ........ 348/345; 348/346; 348/347; 348/348; 348/349

(58) Field of Classification Search ........... 348/345–356
See application file for complete search history.

(56) References Cited

U.S. PATENT DOCUMENTS

| | | | | |
|---|---|---|---|---|
| 6,757,020 | B1 * | 6/2004 | Kikuchi | 348/333.01 |
| 6,906,751 | B1 * | 6/2005 | Norita et al. | 348/349 |
| 7,443,425 | B2 * | 10/2008 | Ogawa | 348/221.1 |
| 7,639,281 | B2 * | 12/2009 | Sudo | 348/222.1 |
| 2003/0146988 | A1 | 8/2003 | Shiraishi | |
| 2004/0001158 | A1 | 1/2004 | Aoki | |
| 2004/0169767 | A1 * | 9/2004 | Norita et al. | 348/350 |
| 2005/0185064 | A1 * | 8/2005 | Ogawa | 348/222.1 |
| 2007/0177862 | A1 | 8/2007 | Terayama et al. | |

FOREIGN PATENT DOCUMENTS

| | | |
|---|---|---|
| EP | 1 335 589 A1 | 8/2003 |
| JP | 8-76169 A | 3/1996 |
| JP | 8-248510 A | 9/1996 |
| JP | 2002-258344 A | 9/2002 |
| JP | 2003-207712 A | 7/2003 |
| JP | 2003-232984 A | 8/2003 |
| JP | 2003-348426 A | 12/2003 |
| JP | 2004-086018 A | 3/2004 |
| JP | 2006-208558 A | 8/2006 |
| JP | 2007-206433 A | 8/2007 |

OTHER PUBLICATIONS

Notice of Reasons for Rejection, dated Jun. 28, 2011, issued in corresponding Jp Application No. 2007-286250, 9 pages in English and Japanese.

* cited by examiner

Primary Examiner — David Ometz
Assistant Examiner — Antoinette Spinks
(74) Attorney, Agent, or Firm — Sughrue Mion, PLLC

(57) ABSTRACT

If an aperture of the objective-imaging is the same as an aperture when a state has turned into a focused state with autofocus before the objective-imaging or if an F value of the objective-imaging is equal to or greater than an F value when a state has turned into a focused state with autofocus before the objective-imaging, the focused state is maintained and the focusing of the objective-imaging is skipped. Even in other cases, a in-focus position is detected near the in-focus position before the objective-imaging. Alternatively, if the user selects a speed priority, the in-focus position is detected in a narrow range near the in-focus position before the objective-imaging. This enables to achieve both enough speed and focus accuracy of the main-photographing.

32 Claims, 28 Drawing Sheets

FIG.28A

PREVIOUS PHOTOMETRIC VALUES
OF DIVIDED AREAS

FIG.28B

CURRENT PHOTOMETRIC VALUES
OF DIVIDED AREAS

COMPARE PHOTOMETRIC VALUES OF CORRESPONDING DIVIDED AREAS
AND ADD UP ABSOLUTE VALUES OF DIFFERENCES

IMAGING APPARATUS AND METHOD

BACKGROUND OF THE INVENTION

1. Field of the Invention

The present invention relates to a photographing apparatus including an autofocus function.

2. Description of the Related Art

According to Japanese Patent Application Laid-Open No. 8-248510, in a complex camera including a still camera unit, a video camera unit, and a photographic lens common to the units, a control device performs a servo control based on repeated detections of the focus detection device if a movement detecting device detects that a subject is moving during still image photographing, and performs a one shot control, in which the lens drive is terminated once the lens is focused and then the focus is locked, if it is detected that the subject is not moving.

Japanese Patent Application Laid-Open No. 2003-207712 discloses an imaging apparatus that adjusts the focus of an optical device, the imaging apparatus comprising: an optical unit that receives a light beam from a subject to generate a subject image; a contrast detecting unit that detects a contrast value of the subject image; a ranging unit that calculates range information indicative of a distance from the focusing apparatus to the subject; an adjustment instruction accepting unit that accepts instruction information indicative of adjustment of the focus of the optical unit; a focus control unit that adjusts the focus of the optical unit when the adjustment instruction accepting unit accepts the instruction information; and a range information storing unit that stores a contrast value detected by the contrast detecting unit when the adjustment instruction accepting unit accepts the instruction information and range information calculated by the ranging unit.

In Japanese Patent Application Laid-Open No. 2002-258344, an arithmetic processing circuit executes, in response to a first instruction from a release SW for starting photographing, AE and AF processes based on a signal outputted from an imaging element to control the lens position, the aperture size, and the shutter speed of the imaging element and keeps an elapsed time from the acquisition of the first instruction to the acquisition of a second instruction that is instructed following the first instruction and that is from the release SW for starting photographing. In the photographing started according to the second instruction, the arithmetic processing circuit executes the AE and AF processes based on the elapsed time, and if the elapsed time is short, the arithmetic processing circuit diverts a control result of the AE and AF processes executed in the photographing started according to the first instruction without executing one or both of the AE and AF processes.

In Japanese Patent Application Laid-Open No. 2003-232984, according to a focus instructing operation, a CPU compares, before the focusing operation, current image data obtained just after the focus instructing operation with the focus lens at a last-time in-focus position detected by the focusing operation of the last time and last-time image data that is obtained during the focusing operation of the last time or just after the end of the focusing operation of the last time with the focus lens at the last-time in-focus position. The CPU then determines whether the focused state from the focusing operation of the last time is maintained. If not maintained, the CPU does not drive the focus lens in the in-focus position detection or narrows down the driving region of the focus lens.

In Japanese Patent Application Laid-Open No. 8-76169, a focus adjusting lens is set at the hyperfocal distance in advance. Once an operation for starting a photographing preparation operation is performed, a photometric device ALS is activated, and then whether an aperture value obtained from calculated photometric information is greater than a predetermined aperture value is compared. If it is greater, the photographic operation is permitted. If it is smaller, distance measuring devices AFS and AFC are activated. A control device MPU for permitting the photographic operation is installed after activating a lens driving unit LM based on calculated distance measurement information. If an aperture value obtained as a result of photometry is greater than a predetermined aperture value, a subject can be focused at the depth of field of the lens set at the hyperfocal distance. Therefore, the releasing is immediately performed without driving the lens. In other cases, the lens is driven.

SUMMARY OF THE INVENTION

There is a problem that a large shutter time lag occurs as the time is consumed in the autofocus (AF) operation, and the user cannot take a picture that the user desires at the desired moment. Conventionally, the use of continuous AF or the like has been considered to reduce the shutter time lag. However, achievements in both enough speed and focus accuracy cannot be attained.

An object of the present invention is to achieve both enough speed and focus accuracy of main-photographing.

An aspect of the present invention provides an imaging apparatus including: an imaging optical system that forms a subject image on a predetermined imaging plane; a driving unit that drives the imaging optical system to change a focal position; an imaging unit that photoelectrically converts the subject image formed on the imaging plane to output an image signal; an aperture that adjusts an amount of light entering the imaging unit; a generating unit that generates image data based on the image signal outputted from the imaging unit; an operating unit that accepts input of an imaging preparation instruction and an objective-imaging instruction; a pre-imaging AF unit that detects a in-focus position of the subject image before the imaging preparation instruction is inputted; a pre-imaging AE unit that determines a target light exposure of the imaging unit before the imaging preparation instruction is inputted; an objective-imaging AF unit that detects the in-focus position of the subject image after the imaging preparation instruction is inputted; an objective-imaging AE unit that determines the target light exposure of the imaging unit after the imaging preparation instruction is inputted; and an imaging control unit that performs: before the imaging preparation instruction is inputted, a first control of setting the focal position of the imaging optical system to the in-focus position detected by the pre-imaging AF unit and of setting the opening size of the aperture based on the target light exposure determined by the pre-imaging AE unit; after the imaging preparation instruction is inputted, a second control of setting the focal position of the imaging optical system to the in-focus position detected by the objective-imaging AF unit and of setting the opening size of the aperture based on the target light exposure determined by the objective-imaging AE unit; and at a point that the imaging preparation instruction is inputted, a third control of skipping the in-focus position detection by the objective-imaging AF unit depending on whether the focal position of the imaging optical system is set to the in-focus position detected by the pre-imaging AF unit and whether the opening size of the aperture that should be set based on the target light exposure of the objective-imaging AE unit is substantially the same as the opening size of the aperture set based on the target light exposure of the pre-imaging AE unit.

An aspect of the present invention provides an imaging apparatus including: an imaging optical system that forms a subject image on a predetermined imaging plane; a driving unit that drives the imaging optical system to change a focal position; an imaging unit that photoelectrically converts the subject image formed on the imaging plane to output an image signal; an aperture that adjusts an amount of light entering the imaging unit; a generating unit that generates image data based on the image signal outputted from the imaging unit; an operating unit that accepts input of an imaging preparation instruction and an objective-imaging instruction; a pre-imaging AF unit that detects a in-focus position of the subject image before the imaging preparation instruction is inputted; a pre-imaging AE unit that determines a target light exposure of the imaging unit before the imaging preparation instruction is inputted; an objective-imaging AF unit that detects the in-focus position of the subject image after the imaging preparation instruction is inputted; an objective-imaging AE unit that determines the target light exposure of the imaging unit after the imaging preparation instruction is inputted; and an imaging control unit that performs: before the imaging preparation instruction is inputted, a first control of setting the focal position of the imaging optical system to the in-focus position detected by the pre-imaging AF unit and of setting the opening size of the aperture based on the target light exposure determined by the pre-imaging AE unit; after the imaging preparation instruction is inputted, a second control of setting the focal position of the imaging optical system to the in-focus position detected by the objective-imaging AF unit and of setting the opening size of the aperture based on the target light exposure determined by the objective-imaging AE unit; and at a point that the imaging preparation instruction is inputted, a third control of setting a in-focus position detection range of the objective-imaging AF unit near the in-focus position detected by the pre-imaging AF unit depending on whether the focal position of the imaging optical system is set to the in-focus position detected by the pre-imaging AF unit and whether the opening size of the aperture that should be set based on the target light exposure of the objective-imaging AE unit is substantially different from the opening size of the aperture set based on the target light exposure of the pre-imaging AE unit.

An aspect of the present invention provides an imaging apparatus including: an imaging optical system that forms a subject image on a predetermined imaging plane; a driving unit that drives the imaging optical system to change a focal position; an imaging unit that photoelectrically converts the subject image formed on the imaging plane to output an image signal; an aperture that adjusts an amount of light entering the imaging unit; a generating unit that generates image data based on the image signal outputted from the imaging unit; an operating unit that accepts input of an imaging preparation instruction and an objective-imaging instruction; a pre-imaging AF unit that detects a in-focus position of the subject image before the imaging preparation instruction is inputted; a pre-imaging AE unit that determines a target light exposure of the imaging unit before the imaging preparation instruction is inputted and that determines an aperture value before the objective-imaging based on the target light exposure; an objective-imaging AF unit that detects the in-focus position of the subject image after the imaging preparation instruction is inputted; an objective-imaging AE unit that determines the target light exposure of the imaging unit after the imaging preparation instruction is inputted and that determines the aperture value of the objective-imaging based on the target light exposure; and an imaging control unit that performs: before the imaging preparation instruction is inputted, a first control of setting the focal position of the imaging optical system to the in-focus position detected by the pre-imaging AF unit and of setting the opening size of the aperture based on the aperture value determined by the pre-imaging AE unit; after the imaging preparation instruction is inputted, a second control of setting the focal position of the imaging optical system to the in-focus position detected by the objective-imaging AF unit and of setting the opening size of the aperture based on the aperture value determined by the objective-imaging AE unit; and at a point that the imaging preparation instruction is inputted, a third control of skipping the in-focus position detection of the objective-imaging AF unit depending on whether the focal position of the imaging optical system is set to the in-focus position detected by the pre-imaging AF unit and whether the aperture value determined by the objective-imaging AE unit is equal to or greater than the aperture value determined by the pre-imaging AE unit.

Preferably, the imaging control unit sets the in-focus position detection range of the objective-imaging AF unit near the in-focus position detected by the pre-imaging AF unit, if, at a point that the imaging preparation instruction is inputted, the focal position of the imaging optical system is set to the in-focus position detected by the pre-imaging AF unit and the aperture value determined by the objective-imaging AE unit is less than the aperture value determined by the pre-imaging AE unit.

An aspect of the present invention provides an imaging apparatus comprising: an imaging optical system that forms a subject image on a predetermined imaging plane; a driving unit that drives the imaging optical system to change a focal position; an imaging unit that photoelectrically converts the subject image formed on the imaging plane to output an image signal; an aperture that adjusts an amount of light entering the imaging unit; a generating unit that generates image data based on the image signal outputted from the imaging unit; an operating unit that accepts input of an imaging preparation instruction and an objective-imaging instruction; a pre-imaging AF unit that detects a in-focus position of the subject image before the imaging preparation instruction is inputted; a pre-imaging AE unit that determines a target light exposure of the imaging unit before the imaging preparation instruction is inputted; an objective-imaging AF unit that detects the in-focus position of the subject image after the imaging preparation instruction is inputted; an objective-imaging AE unit that determines the target light exposure of the imaging unit after the imaging preparation instruction is inputted; a selecting unit that accepts a selection for prioritizing speed of the objective-imaging or for prioritizing focus accuracy of the objective-imaging, and an imaging control unit that performs: before the imaging preparation instruction is inputted, a first control of setting the focal position of the imaging optical system to the in-focus position detected by the pre-imaging AF unit and of setting the opening size of the aperture based on the target light exposure determined by the pre-imaging AE unit; after the imaging preparation instruction is inputted, a second control of setting the focal position of the imaging optical system to the in-focus position detected by the objective-imaging AF unit and of setting the opening size of the aperture based on the target light exposure determined by the objective-imaging AE unit; and at a point that the imaging preparation instruction is inputted, a third control of: setting a in-focus position detection range of the objective-imaging AF unit to a first range near the in-focus position detected by the pre-imaging AF unit or skipping the in-focus position detection of the objective-imaging AF unit, when the focal position of the imaging optical system is set to the in-focus position detected by the pre-imaging AF unit and when the selection unit accepts a selection for prioritizing the speed of the objective-imaging; and setting the in-focus position detection range of the objective-imaging AF unit to a second range that is near the in-focus position detected by the pre-imaging AF unit and that is wider than the first range when the focal position of the imaging optical system is set to the in-focus position detected by the pre-imaging AF unit and when the selecting unit accepts a selection for prioritizing the focus accuracy of the objective-imaging.

Preferably, the imaging apparatus further includes a selecting unit that accepts a selection for prioritizing speed of the objective-imaging or for prioritizing focus accuracy of the objective-imaging. Further, at the point that the imaging preparation instruction is inputted, when the focal position of the imaging optical system is set to the in-focus position detected by the pre-imaging AF unit and the opening size of the aperture set at the point is substantially different from the opening size of the aperture set before the point, the imaging control unit controls to set the in-focus position detection range of the objective-imaging AF unit to a first range near the in-focus position detected by the pre-imaging AF unit if the selecting unit accepts the selection for prioritizing the speed of the objective-imaging, and the imaging control unit controls to set the in-focus position detection range of the objective-imaging AF unit to a second range that is near the in-focus position detected by the pre-imaging AF unit and that is wider than the first range if the selecting unit accepts the selection for prioritizing the focus accuracy of the objective-imaging.

Preferably, the imaging apparatus further includes a selecting unit that accepts a selection for prioritizing the speed of the objective-imaging or for prioritizing the focus accuracy of the objective-imaging. In addition, at the point that the imaging preparation instruction is inputted, when the focal position of the imaging optical system is set to the in-focus position detected by the pre-imaging AF unit and the aperture value determined by the objective-imaging AE unit is less than the aperture value determined by the pre-imaging AE unit, the imaging control unit controls to set the in-focus position detection range of the objective-imaging AF unit to a first range near the in-focus position detected by the pre-imaging AF unit if the selecting unit accepts the selection for prioritizing the speed of the objective-imaging, and the imaging control unit controls to set the in-focus position detection range of the objective-imaging AF unit to a second range that is near the in-focus position detected by the pre-imaging AF unit and that is wider than the first range if the selecting unit accepts the selection for prioritizing the focus accuracy of the objective-imaging.

Preferably, the imaging apparatus further includes an object detecting unit that detects an object in the subject image based on the image data outputted from the generating unit. And in the imaging apparatus, the imaging control unit determines whether the object detecting unit detects the same object before and after the imaging preparation instruction and performs the third control when determining that the object detecting unit detects the same object before and after the imaging preparation instruction.

Preferably, the imaging apparatus further includes: an object detecting unit that detects an object in the subject image based on the image data outputted from the generating unit; and a distance calculating unit that calculates a distance to the object detected by the object detecting unit or a in-focus position of the object. And in the imaging apparatus, the imaging control unit determines whether an absolute value of a difference between the distance or the in-focus position calculated after the imaging preparation instruction and the distance or the in-focus position calculated before the imaging preparation instruction is less than a predetermined threshold and performs the third control when determining that the absolute value of the difference is less than the predetermined threshold.

Preferably, the distance calculating unit calculates the distance to the object or the in-focus position after the imaging preparation instruction based on a relationship between a size of the object detected by the subject detecting unit before the imaging preparation instruction, and the distance to the objet calculated before the imaging preparation instruction or the in-focus position detected by the pre-imaging AF unit before the imaging preparation instruction.

Preferably, the distance calculating unit calculates the distance or the in-focus position after the imaging preparation instruction based on a ratio of the sizes of the objects detected by the object detecting unit before and after the imaging preparation instruction.

Preferably, the imaging control unit performs the third control according to an aperture value corresponding to the target light exposure determined by the objective-imaging AE unit.

Preferably, the imaging control unit performs the third control according to a focal length of a zoom lens of the imaging optical system when the imaging optical system is set to the in-focus position detected by the pre-imaging AF unit.

Preferably, the imaging control unit performs the third control according to a distance to the subject when the imaging optical system is set to the in-focus position detected by the pre-imaging AF unit.

Preferably, the pre-imaging AF unit sets a desired first focus evaluation value calculating area in an imaging range of the imaging unit and calculates a focus evaluation value based on image data corresponding to the first focus evaluation value calculating area among the image data continuously outputted from the generating unit to continuously detect the in-focus position of the subject image according to a local maximum value of the focus evaluation value.

Preferably, the objective-imaging AF unit sets a desired second focus evaluation value calculating area in the imaging range of the imaging unit and calculates a focus evaluation value based on image data corresponding to the second focus evaluation value calculating area among the image data outputted from the generating unit to detect the in-focus position of the subject image according to a local maximum value of the focus evaluation value.

Preferably, the imaging control unit performs the third control if the first focus evaluation value calculating area and the second focus evaluation value calculating area are the same.

Preferably, the pre-imaging AF unit identifies the in-focus position previously detected by the objective-imaging AF unit as the in-focus position of the current objective-imaging if an objective-imaging instruction is inputted at least once before the current objective-imaging instruction is inputted and if an imaging scene when an objective-imaging instruction is previously inputted and an imaging scene when the current objective-imaging instruction is inputted are the same.

Preferably, the pre-imaging AE unit continuously determines the target light exposure of the imaging unit according to a subject brightness obtained based on the image data continuously outputted from the generating unit.

Preferably, the objective-imaging AE unit sets the aperture value of the objective-imaging to the same value as the aperture value determined by the pre-imaging AE unit at the point that the imaging preparation instruction is inputted when the focal position of the imaging optical system is set to the in-focus position detected by the pre-imaging AF unit at the point that the imaging preparation instruction is inputted.

An aspect of the present invention provides an imaging method of an imaging apparatus including: an imaging optical system that forms a subject image on a predetermined imaging plane; a driving unit that drives the imaging optical system to change a focal position; an imaging unit that photoelectrically converts the subject image formed on the imaging plane to output an image signal; an aperture that adjusts an amount of light entering the imaging unit; a generating unit that generates image data based on the image signal outputted from the imaging unit; an operating unit that accepts input of an imaging preparation instruction and an objective-imaging instruction; a pre-imaging AF unit that detects a in-focus position of the subject image before the imaging preparation instruction is inputted; a pre-imaging AE unit that determines a target light exposure of the imaging unit before the imaging preparation instruction is inputted; an objective-imaging AF unit that detects the in-focus position of the subject image after the imaging preparation instruction is inputted; and an objective-imaging AE unit that determines the target light exposure of the imaging unit after the imaging preparation instruction is inputted, the imaging method comprising: before the imaging preparation instruction is inputted, a first control step of setting the focal position of the imaging optical system to the in-focus position detected by the pre-imaging AF unit and of setting the opening size of the aperture based on the target light exposure determined by the pre-imaging AE unit and that performs; after the imaging preparation instruction is inputted, a second control step of setting the focal position of the imaging optical system to the in-focus position detected by the objective-imaging AF unit and of setting the opening size of the aperture based on the target light exposure determined by the objective-imaging AE unit; and at a point that the imaging preparation instruction is inputted, a third control step of skipping the in-focus position detection by the objective-imaging AF unit depending on whether the focal position of the imaging optical system is set to the in-focus position detected by the pre-imaging AF unit and whether the opening size of the aperture that should be set based on the target light exposure of the objective-imaging AE unit is substantially the same as the opening size of the aperture set based on the target light exposure of the pre-imaging AE unit.

An aspect of the present invention provides an imaging method of an imaging apparatus including: an imaging optical system that forms a subject image on a predetermined imaging plane; a driving unit that drives the imaging optical system to change a focal position; an imaging unit that photoelectrically converts the subject image formed on the imaging plane to output an image signal; an aperture that adjusts an amount of light entering the imaging unit; a generating unit that generates image data based on the image signal outputted from the imaging unit; an operating unit that accepts input of an imaging preparation instruction and an objective-imaging instruction; a pre-imaging AF unit that detects a in-focus position of the subject image before the imaging preparation instruction is inputted; a pre-imaging AE unit that determines a target light exposure of the imaging unit before the imaging preparation instruction is inputted; an objective-imaging AF unit that detects the in-focus position of the subject image after the imaging preparation instruction is inputted; and an objective-imaging AE unit that determines the target light exposure of the imaging unit after the imaging preparation instruction is inputted, the imaging method comprising: before the imaging preparation instruction is inputted, a first control step of setting the focal position of the imaging optical system to the in-focus position detected by the pre-imaging AF unit and of setting the opening size of the aperture based on the target light exposure determined by the pre-imaging AE unit; after the imaging preparation instruction is inputted, a second control step of setting the focal position of the imaging optical system to the in-focus position detected by the objective-imaging AF unit and of setting the opening size of the aperture based on the target light exposure determined by the objective-imaging AE unit; and at a point that the imaging preparation instruction is inputted, a third control step of setting a in-focus position detection range of the objective-imaging AF unit near the in-focus position detected by the pre-imaging AF unit depending on whether the focal position of the imaging optical system is set to the in-focus position detected by the pre-imaging AF unit and whether the opening size of the aperture that should be set based on the target light exposure of the objective-imaging AE unit is substantially different from the opening size of the aperture set based on the target light exposure of the pre-imaging AE unit.

An aspect of the present invention provides an imaging method of an imaging apparatus including: an imaging optical system that forms a subject image on a predetermined imaging plane; a driving unit that drives the imaging optical system to change a focal position; an imaging unit that photoelectrically converts the subject image formed on the imaging plane to output an image signal; an aperture that adjusts an amount of light entering the imaging unit; a generating unit that generates image data based on the image signal outputted from the imaging unit; an operating unit that accepts input of an imaging preparation instruction and an objective-imaging instruction; a pre-imaging AF unit that detects a in-focus position of the subject image before the imaging preparation instruction is inputted; a pre-imaging AE unit that determines a target light exposure of the imaging unit before the imaging preparation instruction is inputted and that determines an aperture value before the objective-imaging based on the target light exposure; an objective-imaging AF unit that detects the in-focus position of the subject image after the imaging preparation instruction is inputted; and an objective-imaging AE unit that determines the target light exposure of the imaging unit after the imaging preparation instruction is inputted and that determines the aperture value of the objective-imaging based on the target light exposure, the imaging method comprising: before the imaging preparation instruction is inputted, a first control step of setting the focal position of the imaging optical system to the in-focus position detected by the pre-imaging AF unit and of setting the opening size of the aperture based on the aperture value determined by the pre-imaging AE unit; after the imaging preparation instruction is inputted, a second control step of setting the focal position of the imaging optical system to the in-focus position detected by the objective-imaging AF unit and of setting the opening size of the aperture based on the aperture value determined by the objective-imaging AE unit; and at a point that the imaging preparation instruction is inputted, a third control step of skipping the in-focus position detection of the objective-imaging AF unit depending on whether the focal position of the imaging optical system is set to the in-focus position detected by the pre-imaging AF unit and whether the aperture value determined by the objective-imaging AE unit is equal to or greater than the aperture value determined by the pre-imaging AE unit.

An aspect of the present invention provides an imaging method of an imaging apparatus comprising: an imaging optical system that forms a subject image on a predetermined imaging plane; a driving unit that drives the imaging optical system to change a focal position; an imaging unit that photoelectrically converts the subject image formed on the imaging plane to output an image signal; an aperture that adjusts an amount of light entering the imaging unit; a generating unit that generates image data based on the image signal outputted from the imaging unit; an operating unit that accepts input of an imaging preparation instruction and an objective-imaging instruction; a pre-imaging AF unit that detects a in-focus position of the subject image before the imaging preparation instruction is inputted; a pre-imaging AE unit that determines a target light exposure of the imaging unit before the imaging preparation instruction is inputted; an objective-imaging AF unit that detects the in-focus position of the subject image after the imaging preparation instruction is inputted; an objective-imaging AE unit that determines the target light exposure of the imaging unit after the imaging preparation instruction is inputted, the imaging method comprising: selection accepting step of accepting a selection for prioritizing speed of the objective-imaging or for prioritizing the focus accuracy of the objective-imaging; before the imaging preparation instruction is inputted, a first control step of setting the focal position of the imaging optical system to the in-focus position detected by the pre-imaging AF unit and of setting the opening size of the aperture based on the target light exposure determined by the pre-imaging AE unit; after the imaging preparation instruction is inputted, a second control step of setting the focal position of the imaging optical system to the in-focus position detected by the objective-imaging AF unit and of setting the opening size of the aperture based on the target light exposure determined by the objective-imaging AE unit; and at a point that the imaging preparation instruction is inputted, a third control step of: setting a in-focus position detection range of the objective-imaging AF unit to a first range near the in-focus position detected by the pre-imaging AF unit or skipping the in-focus position detection of the objective-imaging AF unit, when the focal position of the imaging optical system is set to the in-focus position detected by the pre-imaging AF unit and when the selection for prioritizing speed of the objective-imaging is accepted; and setting the in-focus position detection range of the objective-imaging AF unit to a second range that is near the in-focus position detected by the pre-imaging AF unit and that is wider than the first range when the focal position of the imaging optical system is set to the in-focus position detected by the pre-imaging AF unit and when the selection for prioritizing focus accuracy of the objective-imaging is accepted.

According to the aspects of the present invention, results of AF and AE before the photographing preparation instruction is inputted can be utilized to skip or simplify the AF in the objective-imaging, thereby reducing the shutter time lag.

BRIEF DESCRIPTION OF THE DRAWINGS

FIGS. 28A and 28B depict a relationship between an EV value of small areas of previous image data and a photometric value (EV value) of small areas of current image data.

DETAILED DESCRIPTION OF THE PREFERRED EMBODIMENTS

First Embodiment

Figure 1:
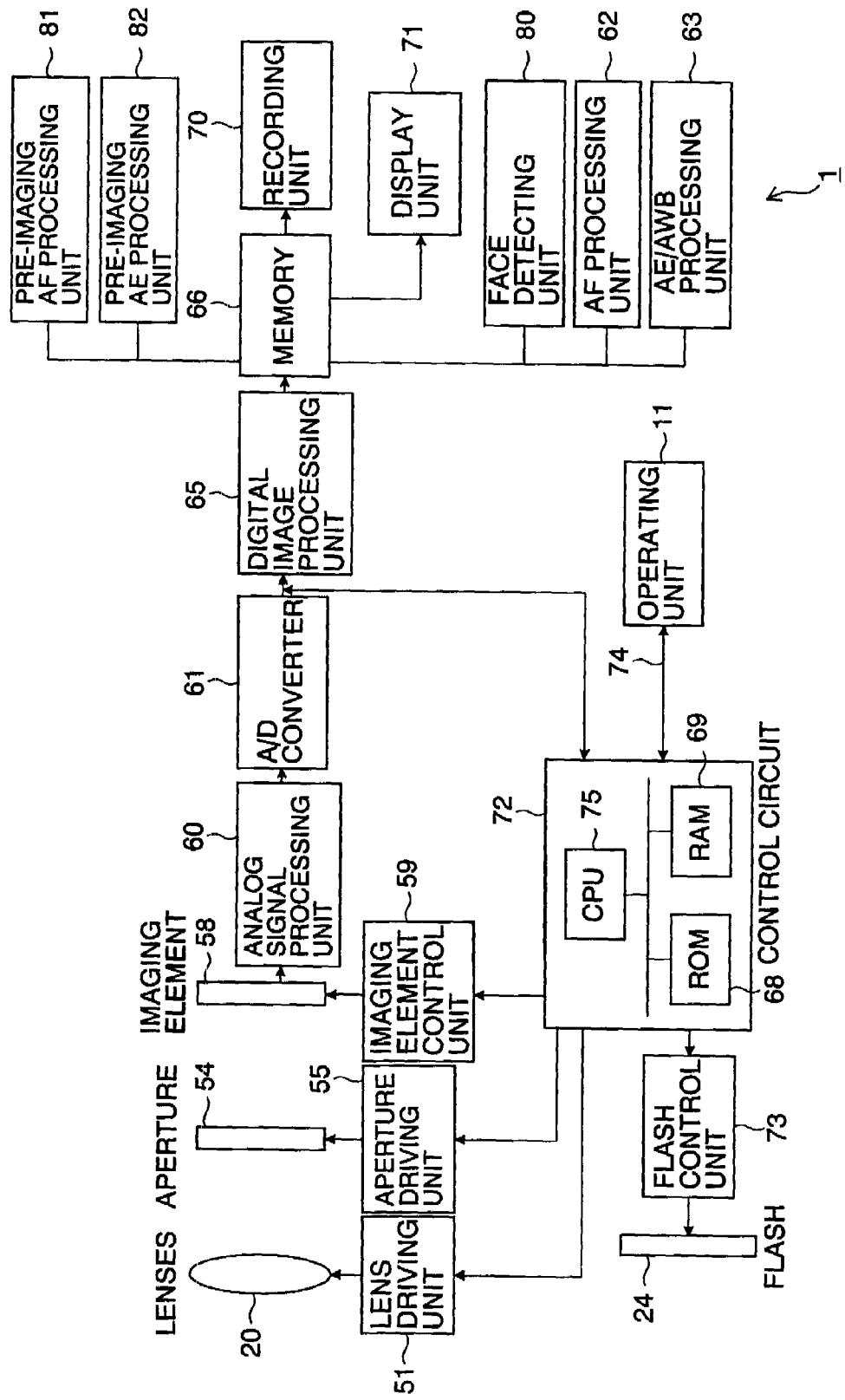
FIG. 1 is a schematic block diagram of a configuration of a digital camera 1.

FIG. 1 is a schematic block diagram of a configuration of a digital camera 1 of the present invention. The digital camera 1 converts image data acquired by photographing into an image file of an Exif format and records the image file in a recording unit 70 such as an external recording medium removable from the main body.

An operation system of the digital camera comprises: an operating unit 11 including an operation mode switch, a menu/OK button, a zoom/up and down arrow lever, a left and right arrow button, a back (return) button, a display switch button, a release button, a power switch, and the like; and an operating system control unit 74 as an interface part for transmitting the operation of the operating unit 11 to the CPU 75.

Lenses 20 include a focus lens and a zoom lens. A lens driving unit 51 can move the lenses 20 in an optical axis direction. The lens driving unit 51 controls the movement of the focus lens or the zoom lens based on focus driving amount data outputted from the CPU 75 or operation amount data of the zoom/up and down lever included in the operating unit 11.

An aperture 54 is driven by an aperture driving unit 55 comprising a motor and a motor driver. The aperture driving unit 55 adjusts an aperture diameter based on aperture value data outputted from an AE/AWB processing unit 63.

An imaging element 58 such as a CCD is arranged at the back of an imaging optical system including the lenses 20 and the aperture 54. The imaging element 58 includes a photoelectric surface on which a plurality of light receiving elements are two dimensionally arranged, and subject light passing through the optical system forms an image on the photoelectric surface and is photoelectrically converted. A micro lens array for collecting light to the pixels and a color filter array composed of regularly aligned with R, G, and B color filters are arranged at the front of the photoelectric surface. The imaging element 58 synchronizes with a vertical transfer clock and a horizontal transfer clock supplied from an imaging element control unit 59 and outputs electric charges stored in the pixels as serial analog photographic signals line by line. The time for storing the electric charges in the pixels, i.e. exposure time, is determined by an electronic shutter driving signal provided by the imaging element control unit 59. The imaging element control unit 59 adjusts the gain of the imaging element 58 such that an analog imaging signal of a predetermined size can be obtained.

The analog photographing signal imported from the imaging element 58 is inputted to an analog signal processing unit 60. The analog signal processing unit 60 comprises a correlated double sampling circuit (CDS) for removing noise of the analog signal and an auto gain controller (AGC) for adjusting the gain of the analog signal.

An A/D converter 61 converts the analog image signal processed by the analog signal processing unit 60 to digital image data. The image data converted to the digital signal is CCD-RAW data having R, G, and B density levels of each pixel.

A control circuit 72 generates a timing signal, inputs the timing signal in the imaging element control unit 59, operates the release button included in the operating unit 11, imports the electric charge of the imaging element 58, and synchronizes the process of the analog signal processing unit 60.

A flash control unit 73 emits a flash 24 during photographing. Specifically, the flash control unit 73 turns on the flash 24 when a flash emission mode is set to flash-on and emits the flash 24 in photographing. On the other hand, the flash control unit 73 prohibits emission of the flash 24 in photographing when the flash emission mode is set to flash-off.

A digital signal processing unit 65 applies a white balance (WB) adjustment, a γ correction, and a YC process to the image data of R, G, and B (CCD-RAW data) outputted from the A/D converter 61. The image data after processing is written into a memory 66.

The memory 66 is a work memory used when applying various digital image processes (signal processes) described below to the image data. For example, an SDRAM (Synchronous Dynamic Random Access Memory) is used for transmitting data in synchronization with a bus clock signal at a constant frequency.

A display unit 71 displays image data, as through images (pass-through image), on a liquid crystal monitor not shown, the image data being sequentially stored in the memory 66 after the photographing mode is set until the main-photographing is instructed. Alternatively, the display unit 71 displays image data saved in the recording unit 70 on the liquid crystal monitor during a playback mode. The through images are photographed by the imaging element 58 at predetermined intervals while the photographing mode is selected.

A pre-imaging AF processing unit 81 and a pre-imaging AE processing unit 82 determine photographic conditions based on the through images sequentially supplied before the half-press of the shutter button.

The pre-imaging AF processing unit 81 detects a focal position based on the through images and outputs focus driving amount data. An example of a detection method of the focal position may include a passive method of utilizing a characteristic that the contrast of the image is high in a focused state to detect the in-focus position. More specifically, the pre-imaging AF processing unit 81 extracts high frequency components from the through images and integrates the high frequency components in the entire image or in a specific part of the area of the image (such as central region and face detection region) to thereby obtain an AF (focus) evaluation value. The pre-imaging AF processing unit 81 searches a local maximum point of the obtained AF evaluation value throughout the lens driving range and determines the lens position where the local maximum point can be obtained as the in-focus position.

The pre-imaging AE processing unit 82 measures a subject brightness based on the through images before the main-exposure, determines an aperture value, a shutter speed, and the like based on the measured subject brightness, and determines the aperture value data and shutter speed data as exposure set values (pre-imaging AE process).

An AF processing unit 62 and the AE/AWB processing unit 63 determine photographic conditions based on a pre-image. The pre-image is an image represented based on the image data stored in the memory 66 as a result of the CPU 75, which has detected a half-press signal generated by half-press of the release button, causing the imaging element 58 to execute pre-photographing.

The AF processing unit 62 detects the focal position based on the pre-image and outputs focus driving amount data (AF process). An example of a detection method of the focal position may include a passive method of utilizing a characteristic that the contrast of the image is high in a focused state to detect the in-focus position. More specifically, the AF processing unit 62 extracts high frequency components from the pre-image and integrates the high frequency components in the entire image or in part of the area of the image to thereby obtain an AF (focus) evaluation value. The AF processing unit 62 searches a local maximum point of the obtained AF evaluation value throughout the lens driving range and determines the lens position where the local maximum point can be obtained as the in-focus position.

The AE/AWB processing unit 63 measures the subject brightness based on the pre-image, determines the aperture value, the shutter speed, and the like based on the measured subject brightness, and determines the aperture value data and the shutter speed data as the exposure set values (AE process). The AE/AWB processing unit 63 determines an amount of correction of the white balance of the image data based on the image data obtained from the main-exposure performed according to the full-press of the release button (AWB process).

A user of the digital camera 1 can set the exposure and the white balance by a manual operation if the photographing mode is set to a manual mode. Even if the exposure and the white balance are automatically set, the user can provide an instruction from the operating unit 11, such as the menu/OK button, to manually adjust the exposure and the white balance.

The image processing unit 65 applies, to the image data of the main-image, image quality correction processes, such as a gamma correction, a sharpness correction, and a contrast correction, and a YC process for converting the CCD-RAW data to the YC data comprising Y data that is a luminance signal, Cb data that is a blue color difference signal, and Cr data that is a red color difference signal. The main-image is an image that is imported from the imaging element 58 in the main-photographing executed by the full-press of the release button and that is based on the image data stored in the memory 66 through the analog signal processing unit 60, the A/D converter 61, and the digital signal processing unit 65. Although the upper limit of the number of pixels of the main-image is determined by the number of pixels of the imaging element 58, the number of recording pixels can be changed by setting, for example, fine, normal, and so forth. Meanwhile, the numbers of pixels of the through images and the pre-image are less than the number of pixels of the main-image. For example, the through images and the pre-image are imported with the numbers of pixels of about 1/16 of that of the main-image.

If the amount of light of the flash 24 is made less than during normal photographing, the image processing unit 64 finds the brightness of the face area in the main-image and adjusts the brightness of the face area to a predetermined threshold Th1 when the brightness is smaller than the threshold Th1.

The digital signal processing unit 65 compresses, in a compressed format such as JPEG, the image data of the main-image applied with the correction/conversion process and generates an image file. A tag storing supplementary information such as photograph date and time is attached to the image file based on an Exif format or the like. In case of a playback mode, the digital signal processing unit 65 reads out the compressed image file from the recording unit 70 and expands the image file. The display unit 71 outputs the image data after expansion to an external liquid crystal monitor.

A ROM 68 stores various constants set in the digital camera 1, a program executed by the CPU 75, and the like. A RAM 69 temporarily stores data necessary for the CPU 75 to execute the program.

The CPU 75 controls components of the main body of the digital camera 1 in accordance with signals from processing units such as the operating unit 11 and the AF processing unit 62.

A face detecting unit 80 detects the face of a person from the through images, the pre-image, or the main-image. Specifically, the face detecting unit 80 detects an area with characteristics of face included in a face (for example, a flesh-colored area, an area with eyes, and an area with a shape of a face) as a face area. However, the method is not limited to this.

Figure 2:
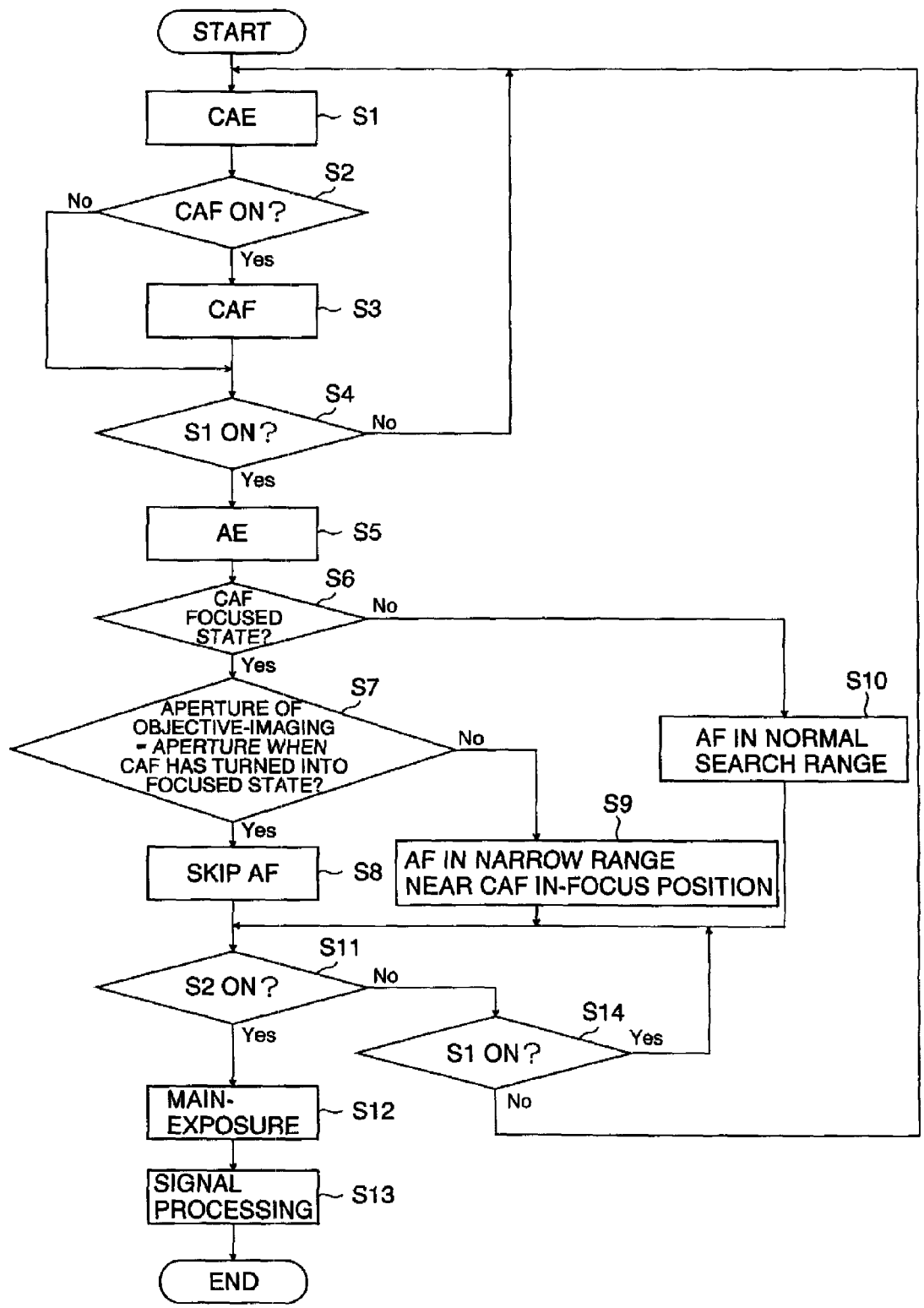
FIG. 2 is a flow chart of a photographing process according to a first embodiment.

FIG. 2 is a flow chart of a photographing process according to the first embodiment. A CPU 72 of the camera 1 controls the execution of the process.

In S1, the pre-imaging AE/AWB processing unit 82 continuously executes the AE based on the sequentially supplied through images. The CPU 72 determines whether the execution of continuous AF (hereinafter "CAF") is selected in advance in a custom menu or the like. If there is such an instruction, the process proceeds to S3. If there is no such an instruction, the process proceeds to S4.

In S3, the pre-imaging AF processing unit 81 executes, based on the sequentially supplied through images, the CAF to continue continuous focus detection operations even after focusing.

In S4, the CPU 72 determines whether the release button is half-pressed. If half-pressed, the process proceeds to S5. If not half-pressed, the process returns to S1.

In S5, the AE/AWB processing unit 63 performs the AE. The execution condition of the AE may or may not be the same as in S1.

In S6, the CPU 72 determines whether the CAF of S3 has been in a focused state when the release button is half-pressed. If the CAF has been in the focused state, the process proceeds to S7. If the CAF has not been in the focused state, the process proceeds to S10.

In S7, the CPU 72 determines whether the aperture of the objective-imaging (imaging according to the full-press of the release button) is the same as the aperture when the autofocus AF has turned into the focused state. If the apertures are the same, the process proceeds to S8. If the apertures are not the same, the process proceeds to S9. "The apertures are the same" is synonymous with "the aperture 54 is not driven by the aperture driving unit 59 and the opening size is not substantially changed" and includes the fact that the aperture value data (F values of the apertures) are the same.

In S8, the in-focus position, which is detected in S3 just before the half-press, is maintained, and the execution of the AF according to the half-press of the release button is skipped.

In S9, the AF is performed with a predetermined range around the position focused by the CAF (for example, two steps in terms of lens drive front and back of the in-focus position) as a search range.

In S10, the AF is performed with a normal search range. The normal search range is, for example, 60 cm to infinity in a normal photographing mode, 1 m (meter) to infinity in a quick photographing mode, and 6 cm to 80 cm in a macro photographing mode.

In S11, the CPU 72 determines whether the release button is full-pressed. If the release button is not full-pressed, the process proceeds to S12. If the release button is full-pressed, the process proceeds to S13.

In S12 and S13, the CPU 72 processes an image signal obtained in the main-exposure after the exposure adjustment and then creates image data for the record.

In S14, the CPU 72 determines whether the half-press of the release button is maintained. If the half-press is not maintained, i.e. if the half-press is released, the process returns to S1. If the half-press is maintained, the process returns to S11.

Figure 3:
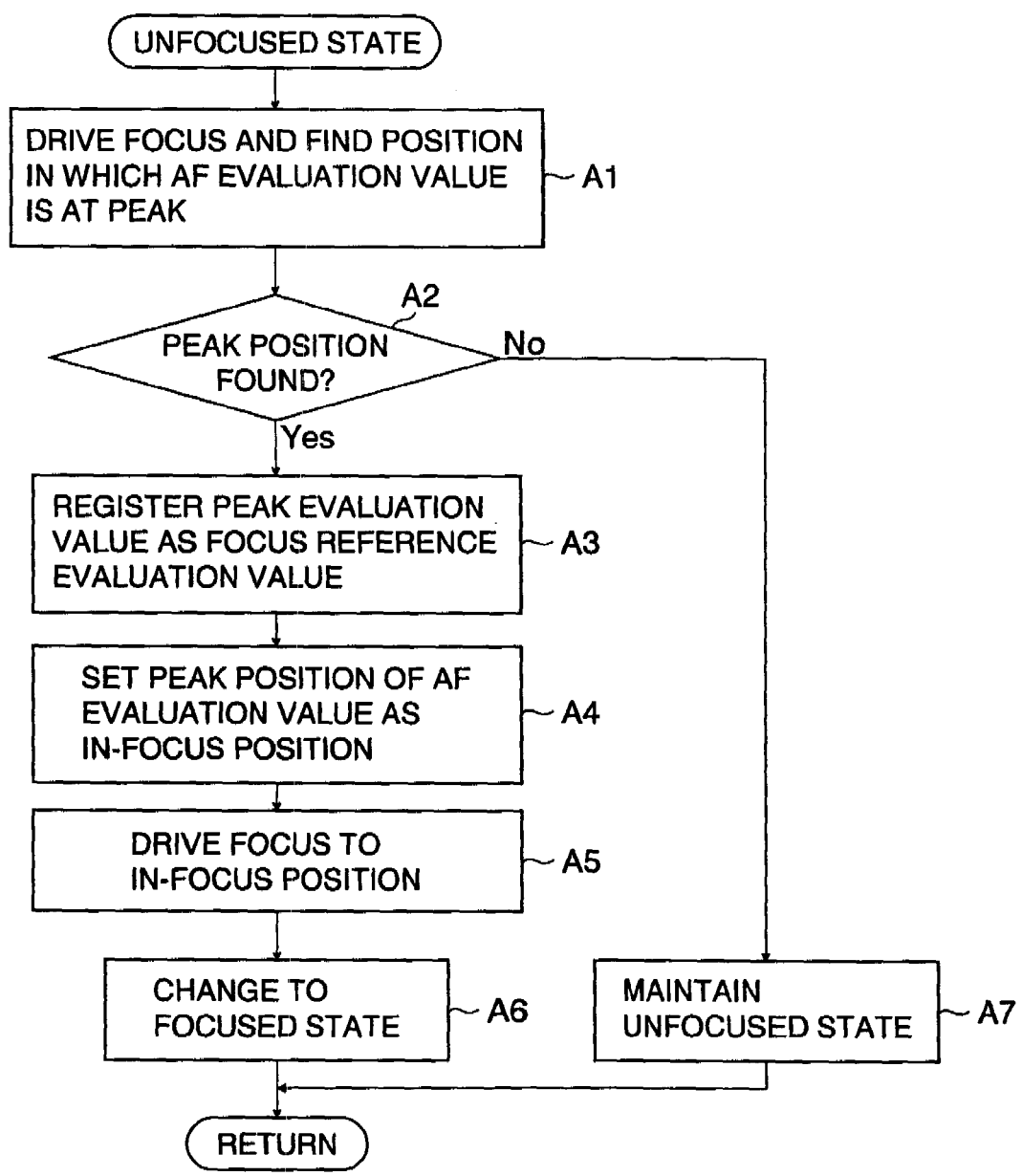
FIG. 3 is a flow chart of a transition process from an unfocused state to a focused state.

FIG. 3 is a flow chart showing a mode of a transition process from an unfocused state to a focused state of the pre-imaging AF processing unit 81.

In A1, the lens 20 (focus lens) is driven, and a lens position (peak position) with a local maximum AF evaluation value is searched.

In A2, whether the peak position is found is determined. If the peak position is found, the process proceeds to A3. If the peak position is not found, the process proceeds to A7.

In A3, the AF evaluation value corresponding to the peak position is registered as a focus reference evaluation value.

Figure 6:
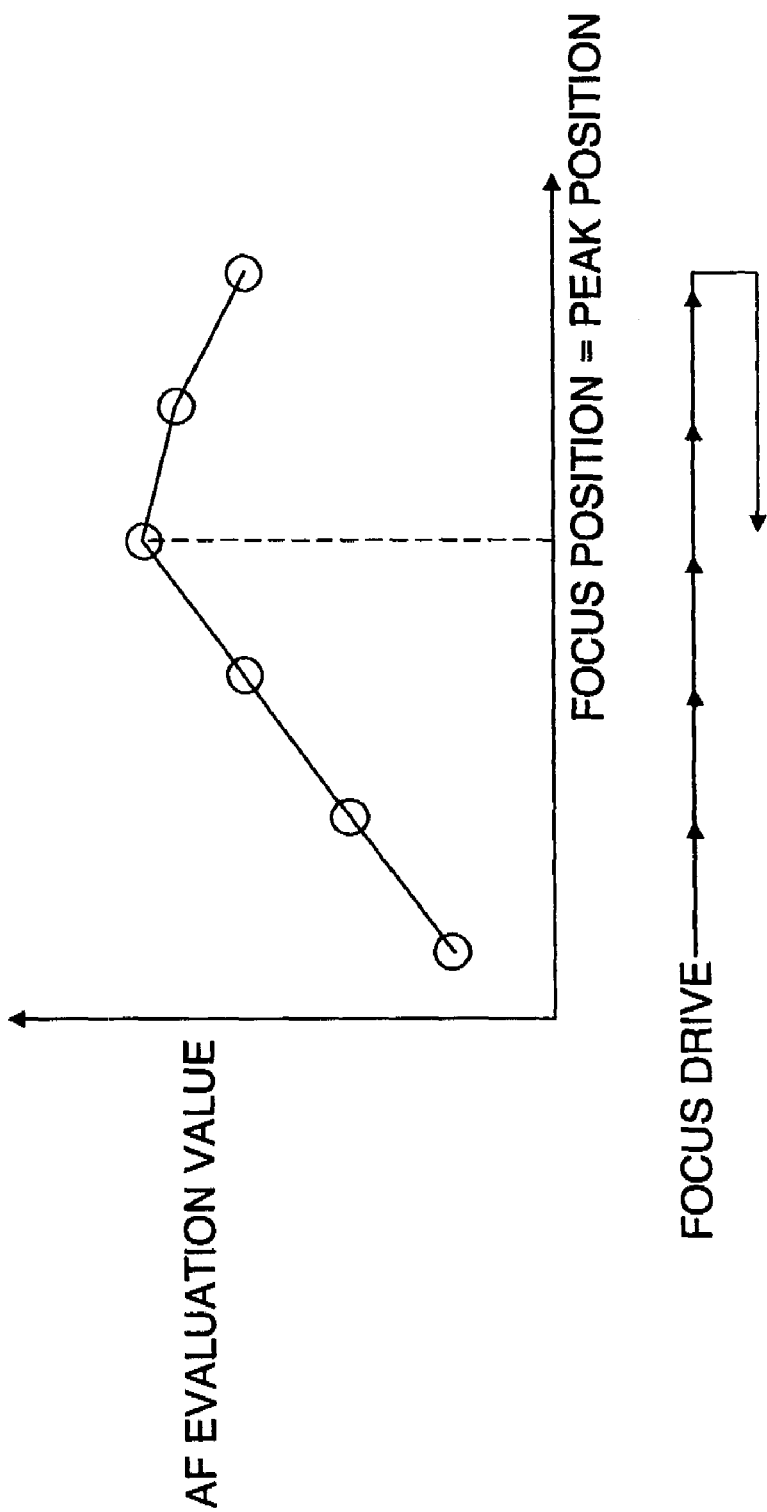
FIG. 6 depicts an example of a peak position.

In A4, the peak position is set as the in-focus position (see FIG. 6).

In A5, the focus lens is driven to the in-focus position.

In A6, a focused state flag is set. Hereinafter, a state in which the focused state flag is set will be referred to as "focused state".

In A7, an unfocused state is maintained. As will be described below, the "unfocused state" is a state in which an unfocused state flag is set.

Figure 4:
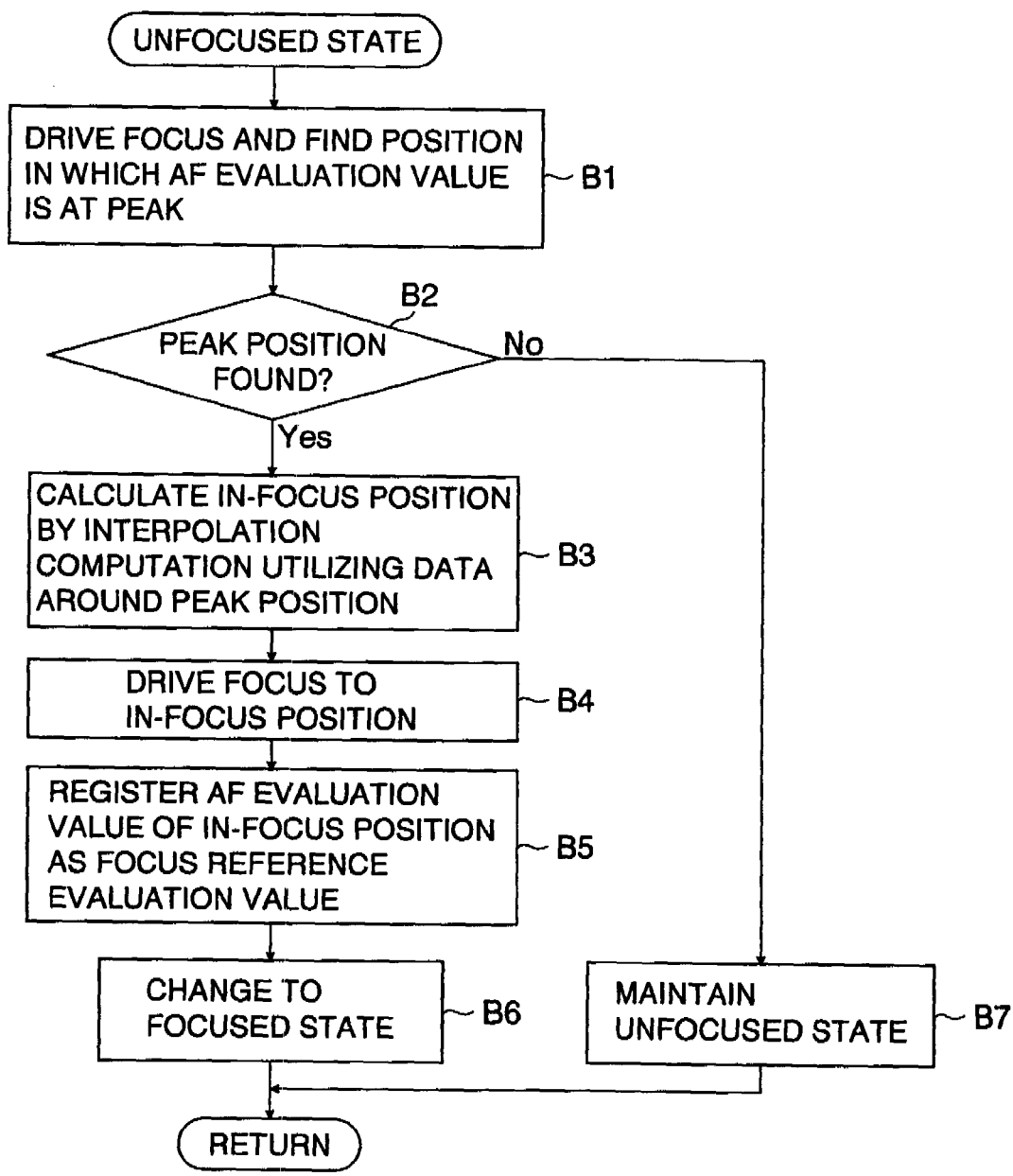
FIG. 4 is a flow chart of another mode of the transition process from the unfocused state to the focused state.

FIG. 4 is a flow chart showing another mode of the transition process from the unfocused state to the focused state of the pre-imaging AF processing unit 81.

In B1, the focus lens is driven, and a lens position (peak position) with a local maximum AF evaluation value is searched.

In B2, whether the peak position is found is determined. If the peak position is found, the process proceeds to B3. If the peak position is not found, the process proceeds to B7.

Figure 7:
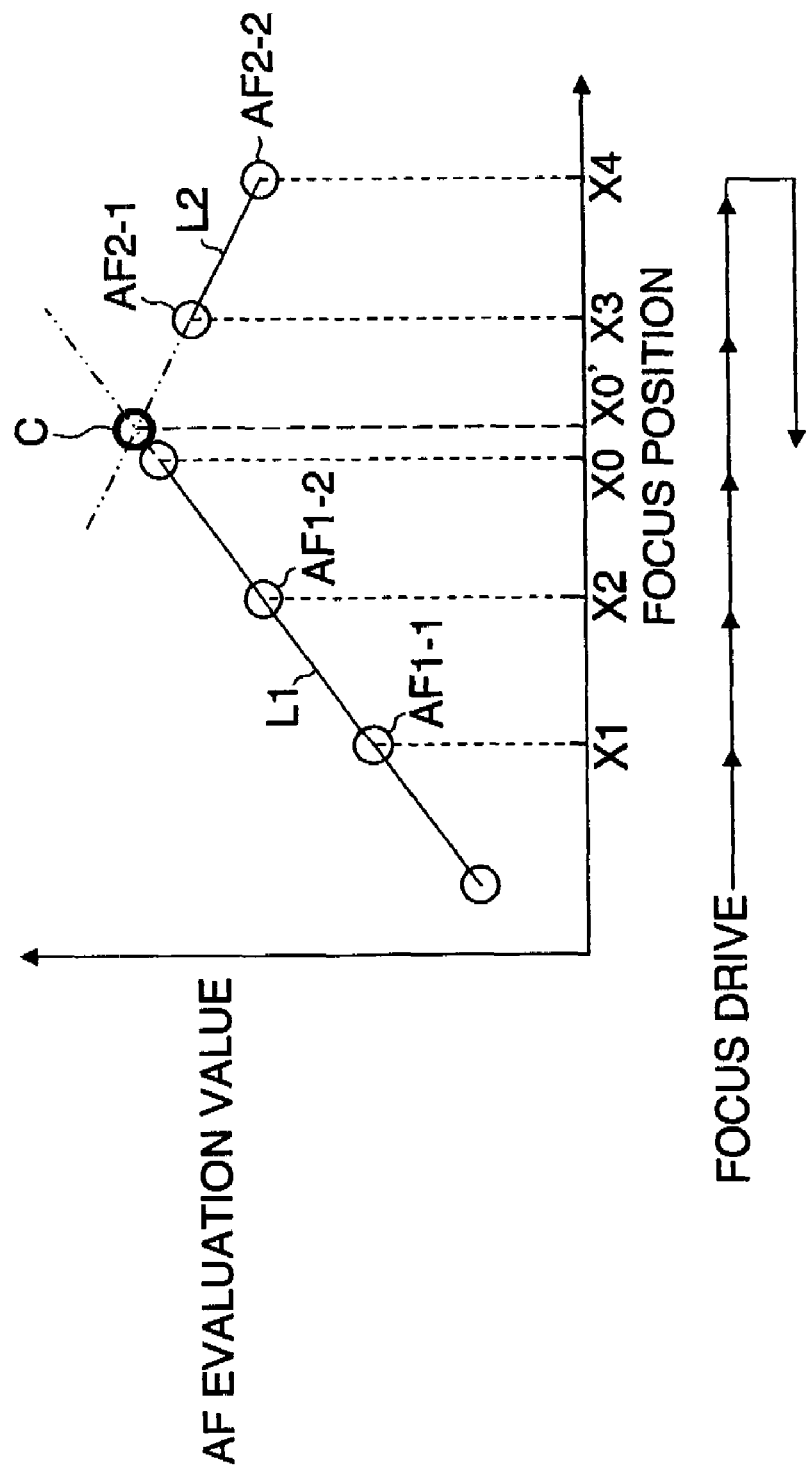
FIG. 7 depicts a in-focus position determined by interpolation computation.

In B3, the in-focus position is calculated by interpolation computation utilizing the AF evaluation value around the peak position. For example, as shown in FIG. 7, a focusing curve on the near side of a peak position X0 and a focusing curve on the infinity side of the peak position are interpolated by various interpolation methods, and a lens position corresponding to a local maximum point F0 of the curve obtained as a result of the interpolation is set as the focus position. Any interpolation method can be used herein. For example, a lens position X0' corresponding to an intersection point C of a line L1, which passes through an AF evaluation value (AF1-1) corresponding to a position X1 located two steps in units of lens driving away from the peak position X0 toward the near side lens drive and an AF evaluation value (AF1-2) corresponding to a position X2 located one step in units of lens driving away from the peak position X0 toward the near side, and a line L2, which passes through an AF evaluation value (AF2-1) corresponding to a position X3 located one step in units of lens driving away from the peak position toward the infinity side and an AF evaluation value (AF2-2) corresponding to a position X4 located two steps in units of lens driving away from the peak position toward the infinity side, is set as the focus position. In this case, it is enough if four steps (X1 to X4) including X0 are set as the search range of the peak position. Alternatively, a three point interpolation method can be used for the interpolation.

In B4, the focus lens is driven to the in-focus position.

In B5, the AF evaluation value corresponding to the peak position is registered as the focus reference evaluation value.

In B6, the focused state flag is set.

In B7, the unfocused state is maintained.

Figure 5:
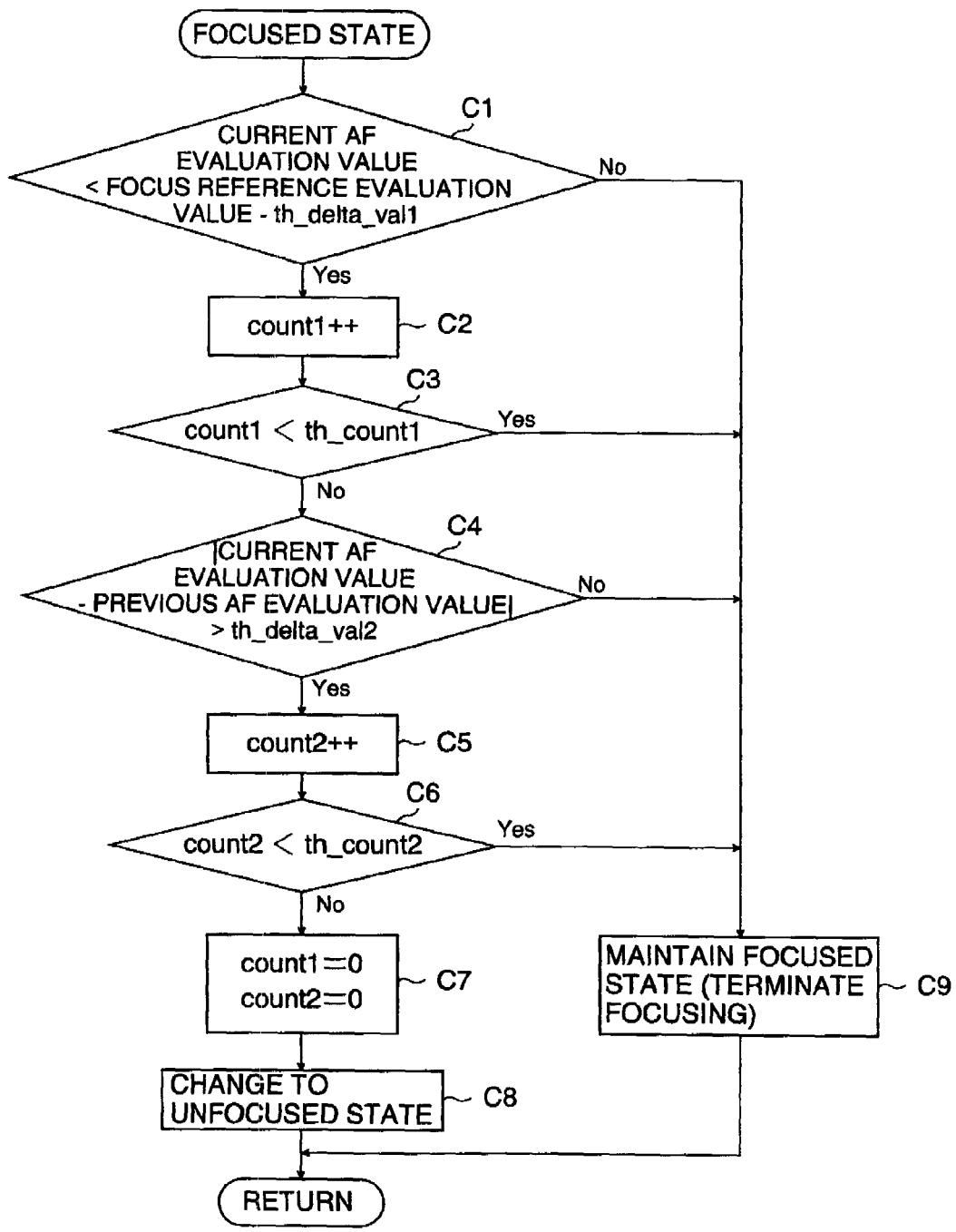
FIG. 5 is a flow chart of a transition process from the focused state to the unfocused state.

FIG. 5 is a flow chart of a transition process from the focused state to the unfocused state of the pre-imaging AF processing unit 81.

In C1, whether current AF evaluation value is smaller than subtraction result of focus reference evaluation value minus th_delta_val1 is determined (i.e., current AF evaluation value<(focus reference evaluation value−th_delta_val1)). If the determination is Yes, the process proceeds to C2. If the determination is No, the process proceeds to C9. Here, th_delta_val1 is an upper limit threshold of the tolerance of a difference between the focus reference evaluation value and the current AF evaluation value, and is set to an arbitrary value in advance.

In C2, a first counter value count1 is incremented.

In C3, whether count1 is smaller than th_count1 is determined (i.e., count1<th_count1). If the determination is Yes, the process proceeds to C9. If the determination is No, the process proceeds to C4. In this case, th_count1 is an upper limit threshold of the first counter value count1 and is set to an arbitrary value in advance.

In C4, whether an absolute value of a difference between a current AF evaluation value and a previous AF evaluation value is greater than th_delta_val2 is determined (i.e., |current AF evaluation value−previous AF evaluation value|>th_delta_val2). If the determination is Yes, the process proceeds to C5. If the determination is No, the process proceeds to C9. In this case, th_delta_val2 is a threshold of the tolerance of an absolute value of a difference between the first and second counter values and is set to an arbitrary value in advance.

In C5, a second counter value count2 is incremented.

In C6, whether count2 is smaller than th_count2 (i.e., count2<th_count2) is determined. If the determination is Yes, the process proceeds to C9. If the determination is No, the process proceeds to C7. In this case, th_count2 is an upper limit threshold of the second counter value and is set to an arbitrary value in advance.

In C7, the first counter value count1 and the second counter value count2 are reset and set to 0.

In C8, the unfocused state flag is set. Hereinafter, a sate in which the unfocused state flag is set will be referred to as "unfocused state".

In C9, the focused state is maintained.

By repeating such a control, an inessential focus lens drive can be prevented even if the AF evaluation value is momentarily disordered for some reason. Automatic recalculation of the in-focus position enables to focus the subject when the scene is changed.

As described, according to this embodiment, focusing on the aperture value in the present embodiment, the AF process is not executed when the aperture value is the same as the aperture value of the objective-imaging since it is not necessary to consider the focusing position movement due to the difference between the apertures. Thus, the shutter time lag from the full-press of the release button to the start of the objective-imaging can be significantly reduced while maintaining the focus accuracy.

In addition, in the present embodiment, even if the apertures are different, the shutter time lag from the full-press of the release button to the start of the objective-imaging can be reduced because the in-focus position is detected from the narrowed search range.

The effective use of the result of the CAF enables to skip or shorten the AF after the half-press of the release button (S1).

Second Embodiment

Figure 8:
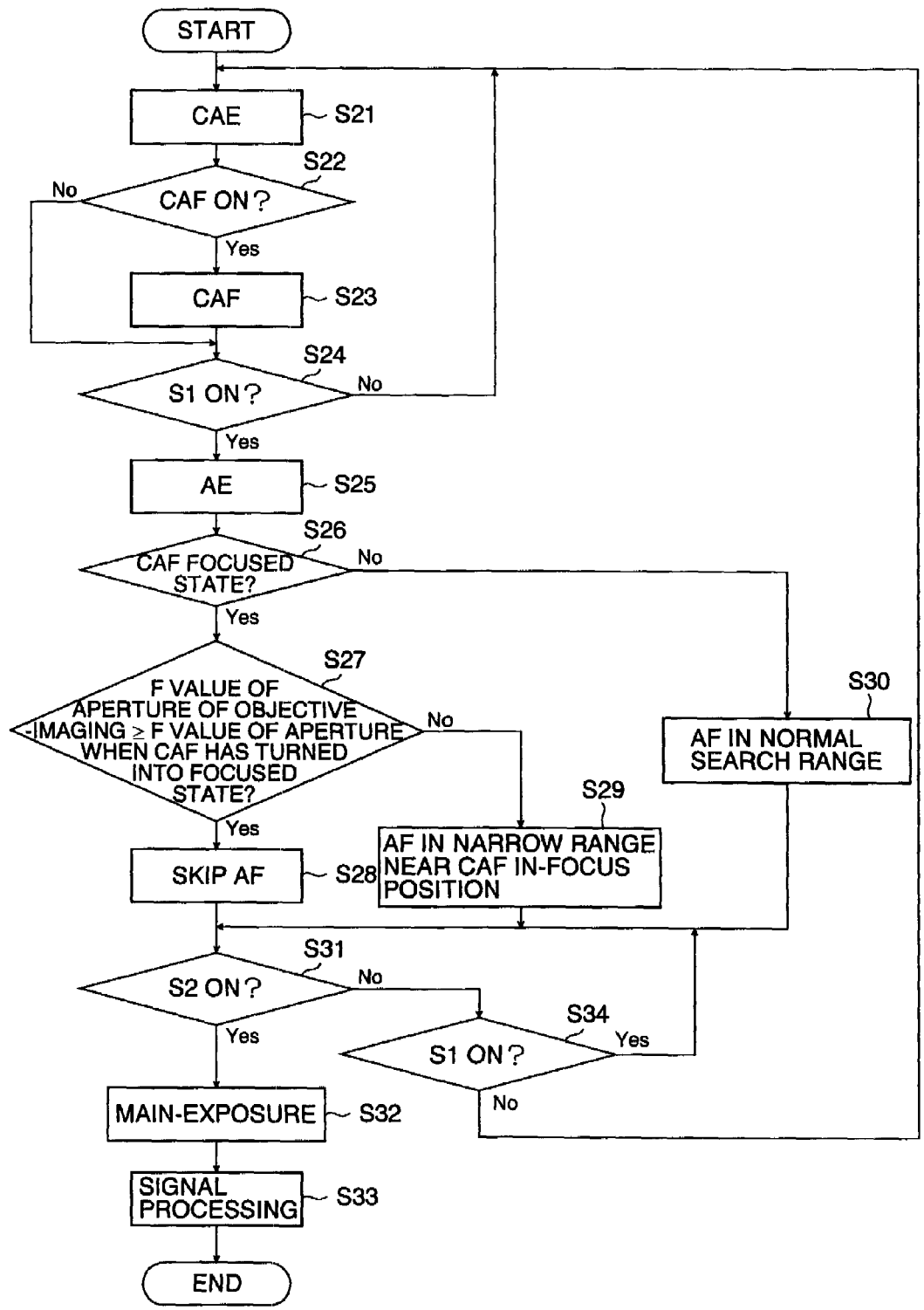
FIG. 8 is a flow chart of a photographing process according to a second embodiment.

FIG. 8 is a flow chart of a photographing process according to a second embodiment.

S21 to S26 are the same as S1 to S6.

In S27, whether the F value of the aperture at the time of the objective-imaging ≧ (is greater than or equal to) F value of the aperture at the time when the state has turned into the focused state in the CAF is determined. If Yes, the process proceeds to S28. If No, the process proceeds to S29.

In S28, the AF is skipped as in S8. This is because the aperture becomes small as the F value becomes relatively large, and the depth of field becomes deeper, making the tolerance of the out-of-focus larger. Therefore, skipping the AF causes no problems if the F value at the time of the half-press of the release button is greater than the F value in the focused state of the CAF.

In S29, the process as in S9 is executed. Although the tolerance of the out-of-focus is smaller than that in the focused state of the CAF, the CAF is in the focused state at the time of the half-press of the release button. Therefore, it is enough to search the focus near the in-focus position.

S30 to S34 are the same as S10 to S14, respectively.

As described, according to this embodiment, focusing on the F value, the AF process is skipped if the F value at the time of the objective-imaging is equal to or greater than the F value at the time when the CAF is focused because it is not necessary to consider the in-focus position movement due to the difference between the F values. Thus, the shutter time lag from the full-press of the release button to the start of the objective-imaging can be significantly reduced while maintaining the focus accuracy.

In the present embodiment, even if the F value is less than the F value when the CAF is focused, the shutter time lag from the full-press of the release button to the start of the objective-imaging can be reduced by narrowing down the search range.

Third Embodiment

Figure 9:
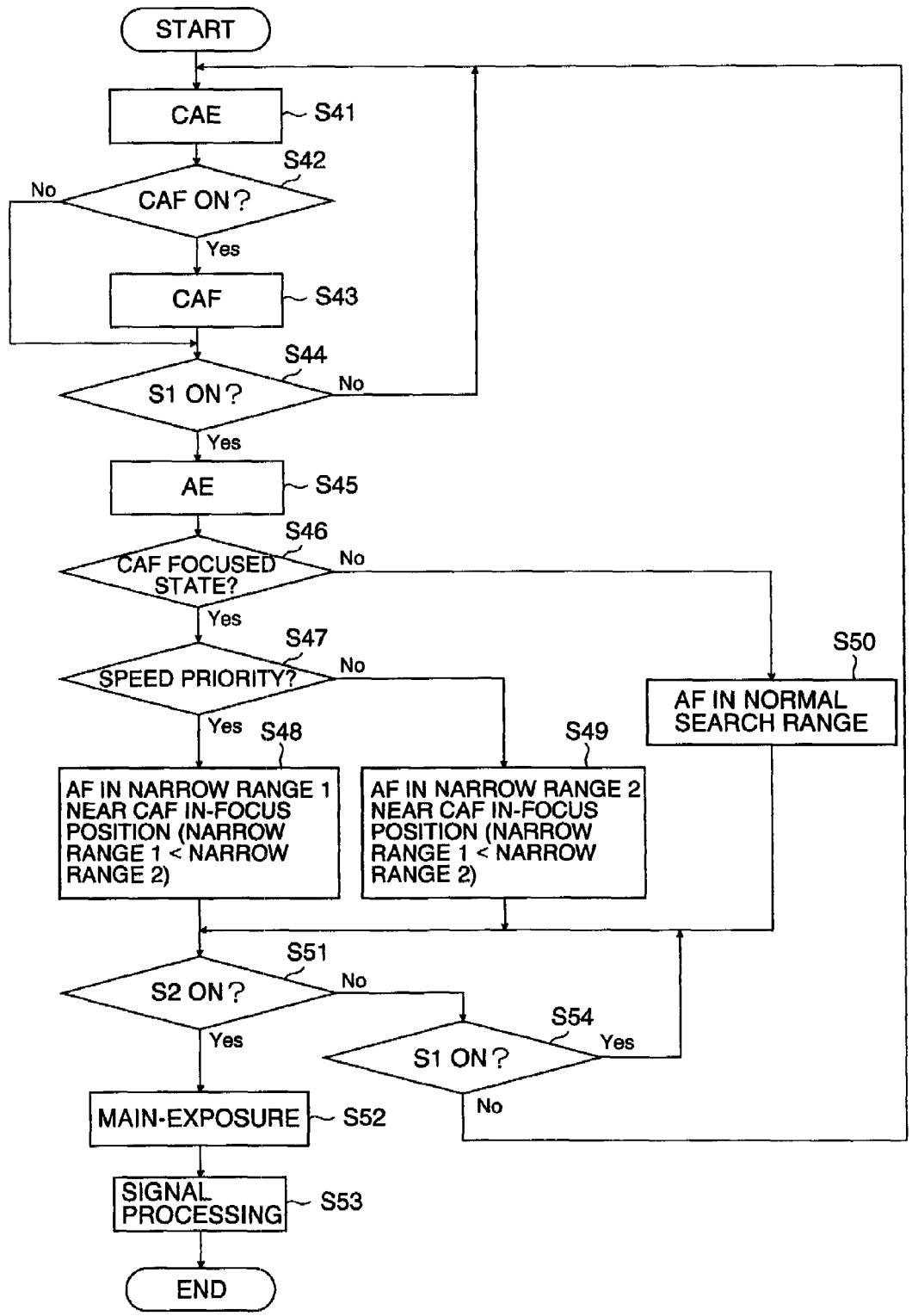
FIG. 9 is a flow chart of a photographing process according to a third embodiment.

FIG. 9 is a flow chart of a photographing process according to a third embodiment.

S41 to S46 are the same as S1 to S6.

In S47, whether a speed priority is selected in advance from a custom menu (as in FIG. 10) or the like is determined. If the speed priority is selected, the process proceeds to S49. If an accuracy priority is selected, i.e. the speed priority is not selected, the process proceeds to S50.

Figure 10:
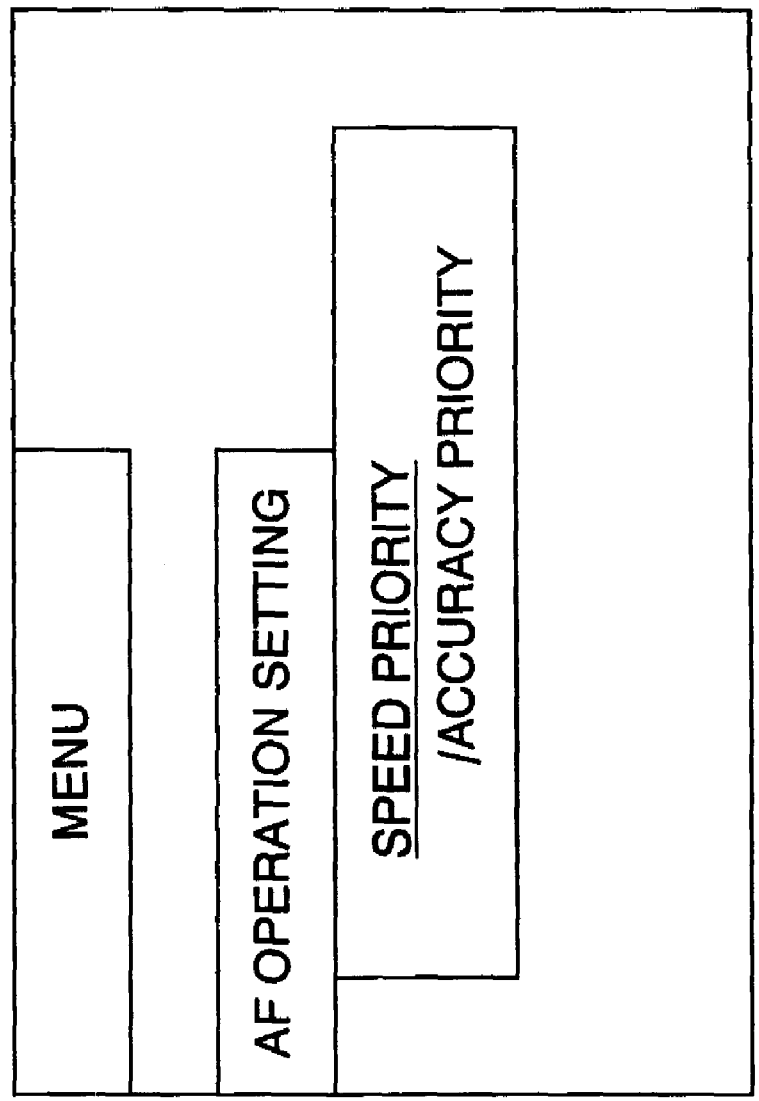
FIG. 10 depicts an example of a custom menu.

FIG. 10 shows an example of the custom menu. "SPEED-PRIORITY" is an item for prioritizing the speed from the full-press to the start of the objective-imaging. "ACCURACY PRIORITY" is an item for prioritizing the focus accuracy. The user can arbitrarily select one of the items with an operation of the operating unit 11.

In S48, a predetermined first range near the in-focus position at the time of the CAF is set to a focus search range (for example, two steps front and back of the in-focus position), and the in-focus position is searched within the range.

In S49, a predetermined second range near the in-focus position at the time of the CAF is set to the focus search range, and the in-focus position is searched within the range. The second range is wider than the first range (for example, three steps front and back of the in-focus position). The first range and the second range may be designed to change according to the aperture in the CAF focused state or the aperture value of the objective-imaging.

S50 to S54 are the same as S10 to S14.

The search range of the in-focus position is narrowed or widened according to the item selection result of either prioritizing the speed from the full-press to the start of the objective-imaging or prioritizing the focus accuracy. This allows photographing according to user's intention.

Figure 11:
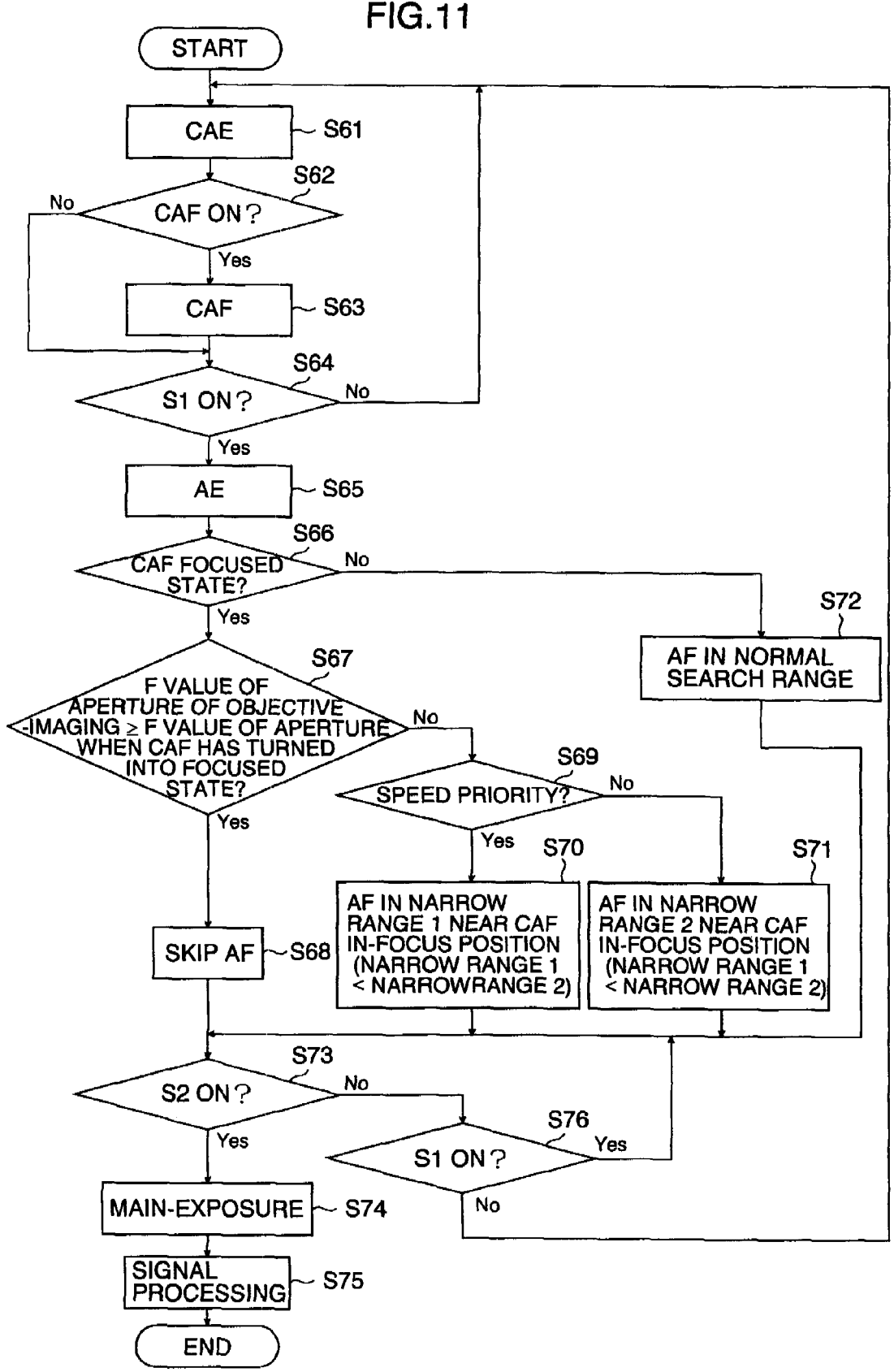
FIG. 11 is a flow chart in which the flow chart of the third embodiment is applied to the flow chart of the second embodiment.

The setting of the focus search range according to the item selection can also be applied to the flow charts in the first and second embodiments. FIG. 11 is a flow chart of the case.

S61 to S68 and S72 to S76 are the same as S21 to S28 and S30 to S34 of the second embodiment, respectively.

S69 to S71 are the same as S47 to S49.

Alternatively, although not shown, S61 to S68 and S72 to S76 may be the same as S1 to S8 and S10 to S14 of the first embodiment, respectively.

Fourth Embodiment

Figure 12:
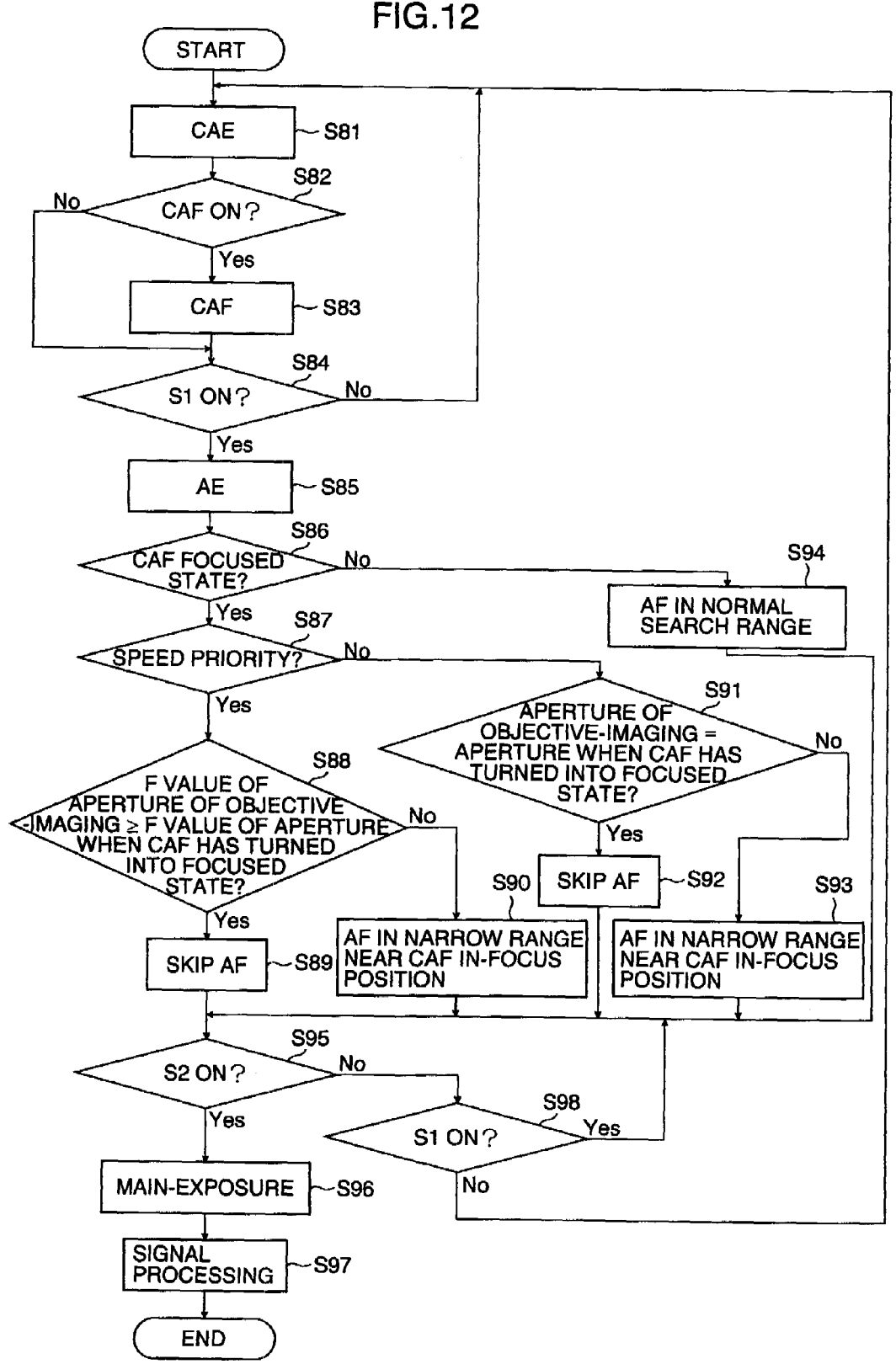
FIG. 12 is a flow chart of a photographing process according to a fourth embodiment.

FIG. 12 is a flow chart of a photographing process according to a fourth embodiment.

S81 to S87 are the same as S41 to S47 (third embodiment).

S88 to S90 are the same as S27 to S29 (second embodiment).

S91 to S98 are the same as S7 to S14 (first embodiment).

In the present photographing process, the AF is skipped when the release switch is half-pressed in the CAF focused state in the case where the user has set the speed priority and if the F value of the aperture of the objective-imaging is equal to or greater than the F value of the aperture when the state has turned into the CAF focused state. The AF is also skipped in the case where the user has set the accuracy priority and if the F value of the aperture of the objective-imaging matches with the F value of the aperture when the state has turned into the CAF focused state.

More specifically, although the real in-focus position may be moved if the aperture values are different in the CAF and the objective-imaging, the AF is not performed even when the apertures are different if the difference is in the direction in which the depth of field is deeper in the objective-imaging, placing more emphasis on the reduction of the shutter time lag than the difference in the in-focus positions in case of the speed priority. Meanwhile, in case of the accuracy priority, the AF is not performed only when the apertures are the same to thereby maintain the accuracy of the in-focus position.

In this way, the AF after the half-press of the release button is skipped or shortened according to the result of the CAF and the result of the user's item selection. Therefore, making the user select a priority item of speed and accuracy enables to perform intended photographing while balancing the speed and the accuracy.

Fifth Embodiment

Figure 13:
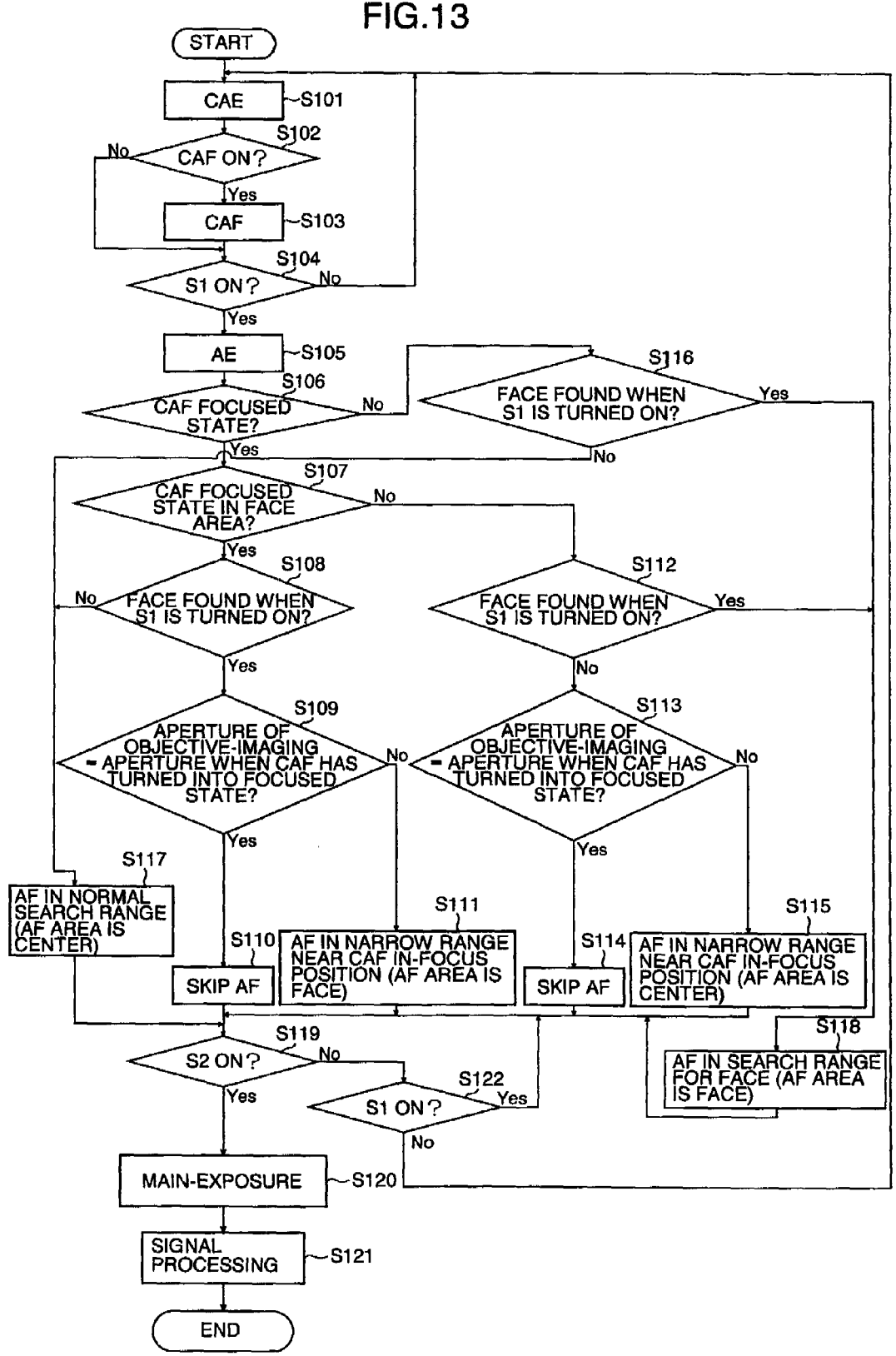
FIG. 13 is a flow chart of a photographing process according to a fifth embodiment.

FIG. 13 is a flow chart of a photographing process according to a fifth embodiment.

S101 to S106 are the same as S1 to S6.

In S107, whether the focused state of the CAF is obtained based on the face area detected by the face detecting unit 80 (for example, whether the in-focus position is detected based on the contrast components of the image data included in the face area) is determined. If Yes, the process proceeds to S108. If No, the process proceeds to S112.

In S108, whether the face area is detected when the release button is half-pressed is determined. If Yes, the process proceeds to S109. If No, the process proceeds to S117.

S109 to S111 are the same as S7 to S9.

Figure 14:
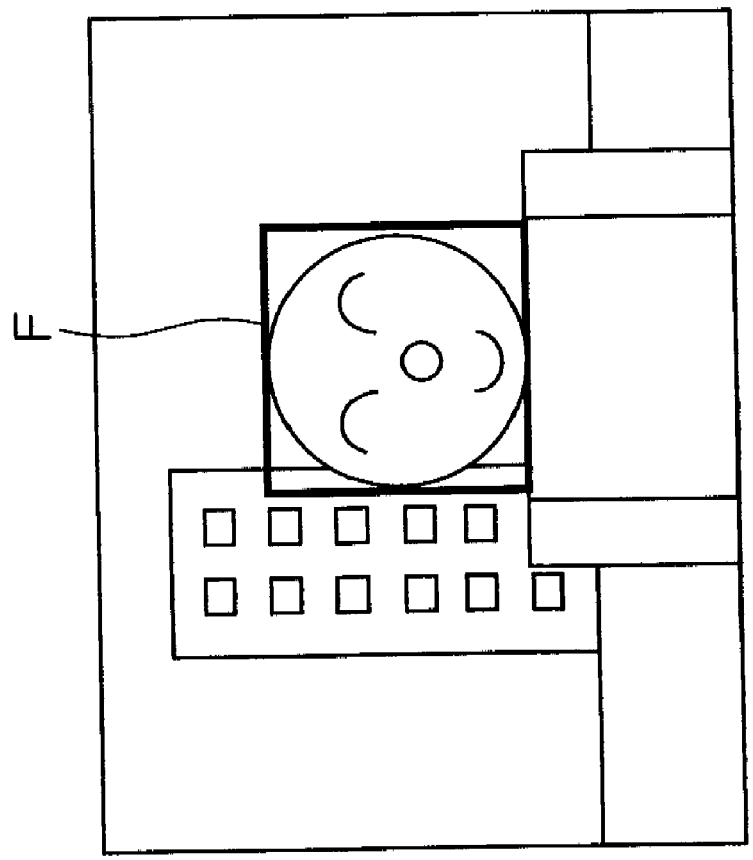
FIG. 14 depicts an example of a face area.

In S112, whether the face area is detected when the release button is half-press is determined. If Yes, the process proceeds to S118. If No, the process proceeds to S113. FIG. 14 is an example of a face area F detected by the face detecting unit 80. The outer frame of the face area F may be superimposed on the through images for display.

S113 to S115 are the same as S7 to S9.

In S116, whether the face area is detected when the release button is half-pressed is determined. If Yes, the process proceeds to S118. If No, the process proceeds to S117.

In S117, a normal in-focus position search range is set, and the in-focus position is searched within the range. However, an area (AF area) of the image data used for calculating the focus evaluation value is set to a predetermined default area (area near the screen center).

In S118, a in-focus position search range for face is set, and the in-focus position is searched within the range. However, the AF area is set to the detected subject area (typically the face area, but there is no need to limit to the face area). As in Japanese Patent Application Laid-Open No. 2007-34261 by the present inventor, in the in-focus position search range for face, the CAF is performed with the face areas of the thorough images as a reference, and a neighborhood spreading for a predetermined range to the near side and the infinity side from the obtained in-focus position is set as the in-focus position search range.

S119 to S121 are the same as S11 to S14.

Even if the state has turned into the focused state by the CAF, the in-focus position of the CAF may be deviated from the real in-focus position and erroneous focusing may occur when the AF area used in the CAF and the AF area after the half-press are different. Specifically, for example, it is assumed that the face area is not detected, the CAF is performed after an area near the center is set as the AF area, and the state has turned into the focused state before the half-press. It is also assumed that the face area is detected about the time just before the release button is half-pressed, a screen as in FIG. 14 is displayed, the user is made to check the face detection, and the user has half-pressed the release button accordingly. The in-focus position has already been detected based on the area near the center in the CAF. However, as the face is detected upon the half-press, the user considers that the face area is the AF area. Therefore, the user will think that the in-focus position is detected based on the face area.

Although the AF area is switched between the face and the central region according to the result of the face detection at the stage of CAF, the state does not transit to the unfocused state in some cases even if the face detection result is changed at the time of the CAF focusing. This is for preventing the drive of the focus to be unstable, and the notion is the same as FIG. 5.

As described, a wrong position may be determined as the in-focus position if the AF area when the state has turned into the focused state with the CAF and the AF area at the time of the half-press are different. Therefore, in the process described above, the existence of the face detection at the time of the half-press is checked, and whether to skip the AF after the half-press is determined accordingly.

Sixth Embodiment

Figure 15:
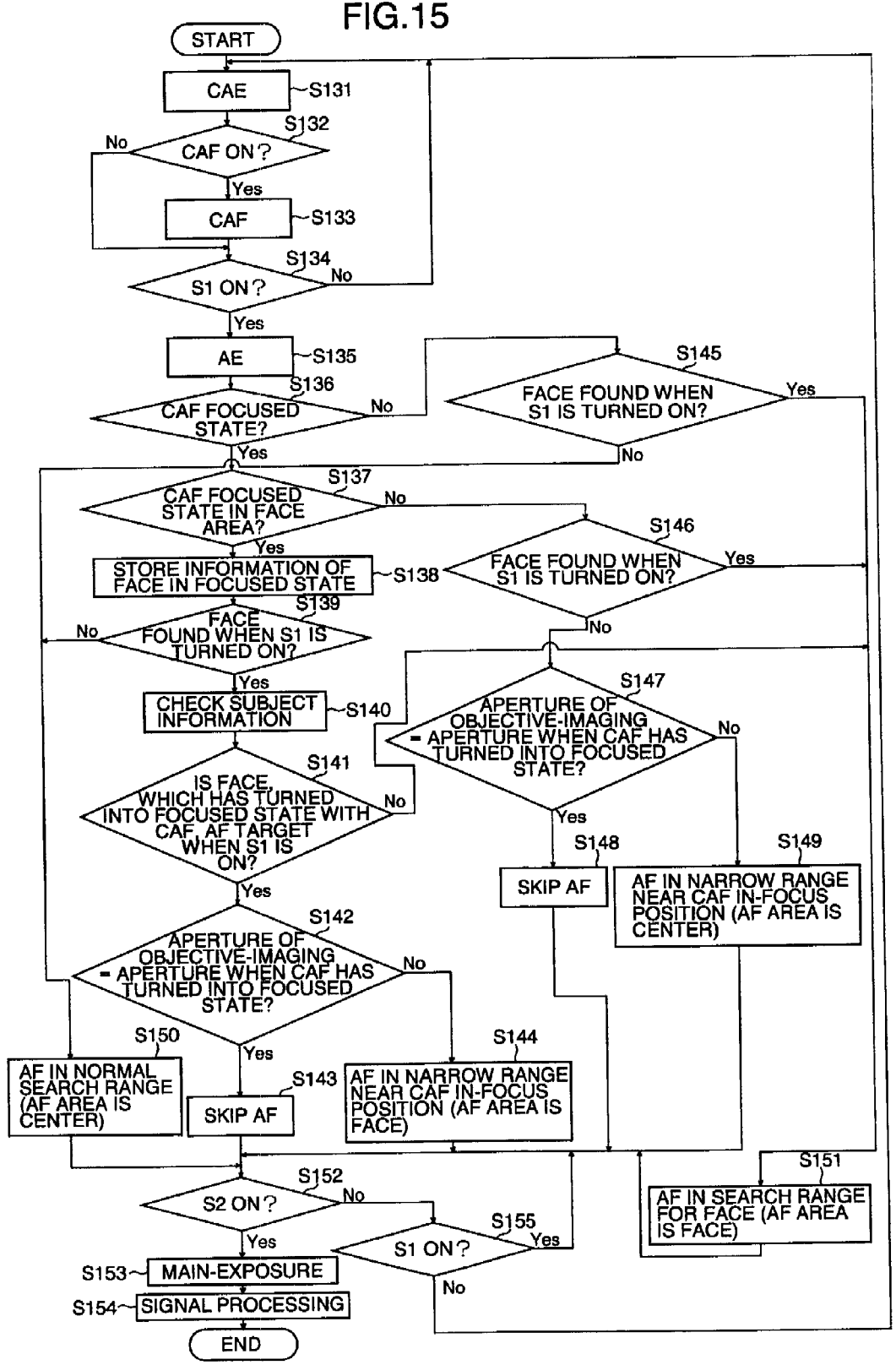
FIG. 15 is a flow chart of a photographing process according to a sixth embodiment.

FIG. 15 is a flow chart of a photographing process according to a sixth embodiment.

S131 to S137 are the same as S101 to S107.

In S138, information related to the subject (subject information) when the state has turned into the focused state is stored. The subject information includes, for example, position information of the face area and feature information such as color and shape. Additionally or alternatively, the subject information includes a degree of coincidence of the faces in the image data acquired before and after the half-press, a correlation coefficient of the subject, a difference value of the pixels, a distribution of histogramed feature values, a cumulative histogram, an AF evaluation value, and a face detection result (score indicative of how much the subject looks like face, position of face area, size, angle, and direction).

In S139, whether the face area is detected when the release button is half-pressed is determined. If Yes, the process proceeds to S140. If No, the process proceeds to S150.

In S140, the subject information is checked.

In S141, whether the face area that has turned into the focused state by the CAF at the time of the half-press has become the AF area is determined. If Yes, the process proceeds to S142. If No, the process proceeds to S151.

S142 to S144 are the same as S109 to S111.

In S145, whether the face area is detected when the release button is half-pressed is determined. If Yes, the process proceeds to S151. If No, the process proceeds to S150.

In S146, whether the face area is detected when the release button is half-pressed is determined. If Yes, the process proceeds to S151. If No, the process proceeds to S147.

S147 to S149 are the same as S113 to S115.

S150 to S155 are the same as S117 to S122.

In the process, whether the AF object (or AF area) when the state has turned into the focused state with the CAF and the AF object (or AF area) when the release button is half-pressed are the same is determined. If the AF objects are the same, the AF is skipped to speed up the objective-imaging. If the AF objects are not the same, the AF is not skipped. In this way, the focused state of the CAF is properly utilized according to the change in the AF objects (or AF areas) before and after the half-press of the release button, thereby preventing erroneous focusing.

Seventh Embodiment

Figure 16:
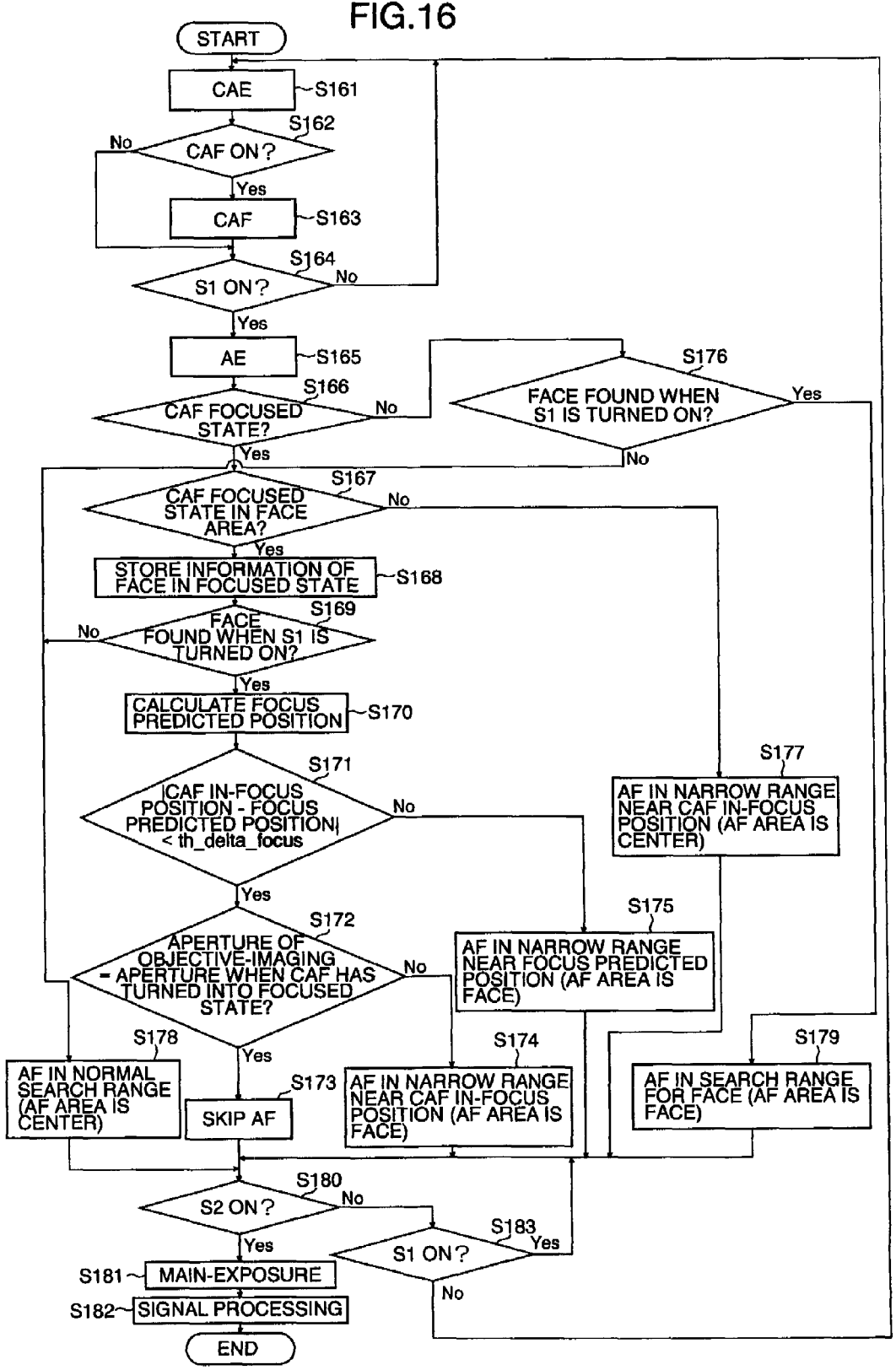
FIG. 16 is a flow chart of a photographing process according to a seventh embodiment.

FIG. 16 is a flow chart of a photographing process according to a seventh embodiment.

S161 to S169 are the same as S131 to S139.

In S170, the in-focus position upon the objective-imaging is predicted based on the subject information when the release button is half-pressed. Various methods can be employed to predict the in-focus position based on the subject information. For example, as described in Japanese Patent Application Laid-Open No. 2006-208626, a movement position of the subject within a time (time from pressing of the release button to the start of actual photographing) equivalent to the shutter time lag is predicted from the direction and the size of the motion vector of the subject. The in-focus position at the time of the objective-imaging is predicted based on the movement position.

In S171, whether an absolute value of a difference between the in-focus position obtained by CAF and the focus predicted position is smaller than th_delta_focus is determined (i.e., in-focus position obtained by CAF−focus predicted position|<th_delta_focus). If Yes, the process proceeds to S172. If No, the process proceeds to S175. In this case, "th_delta_focus" is a threshold of the absolute value of the difference between the in-focus position obtained by the CAF and the focus predicted position. Although the threshold is a value for distinguishing how much the difference between the in-focus position of the CAF and the focus predicted position should be to skip the AF, the specific value of the threshold is arbitrary. For example, the threshold may be 2, 3, or 4 pulses in units of drive pulses of the focus lens.

S172 to S174 are the same as S142 to S144.

In S175, a predetermined range near the focus predicted position is set as the focus search range, and the in-focus position is searched within the range. However, the AF area is set to the subject area (for example, face area).

S176, S177, S178, and S179 are the same as S145, S149, S150, and S151, respectively.

S180 to S182 are the same as S152 to S154.

Although the focus search range of S174, S175, and S177 is distinguished from the in-focus position at the time of the CAF or from the neighborhood of the focus predicted position, the focus search range may be integrated into one of the two.

Although the above described process is performed when the face detection function is in operation, whether to skip the AF can also be distinguished in the same way even if the face detection function is not in operation.

Figure 17:
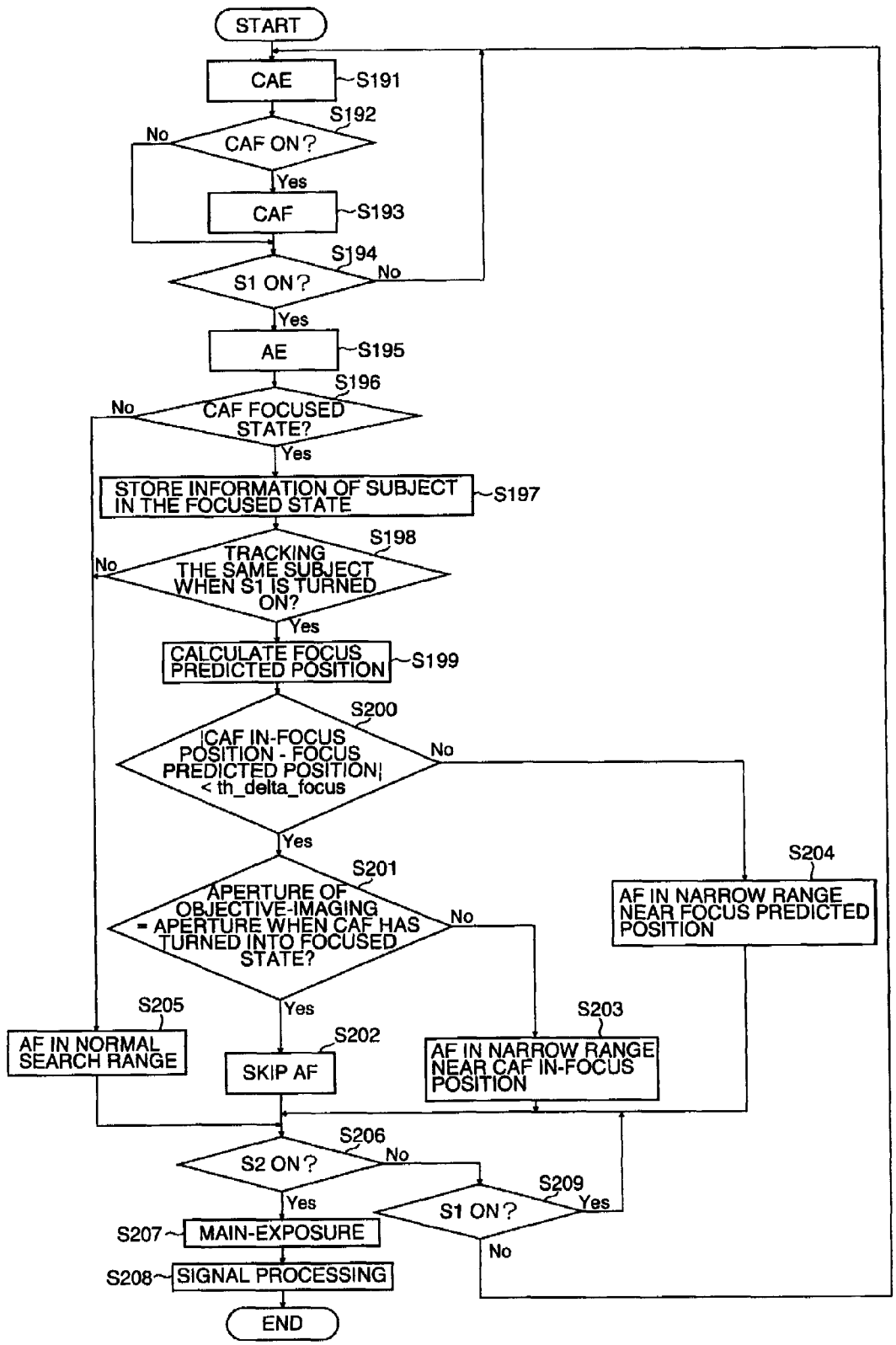
FIG. 17 is a flow chart of an imaging process using a focus predicted position when there is no face detection.

FIG. 17 is a flow chart of an imaging process using the focus predicted position when no face detection is performed.

S191 to S196 are the same as S1 to S6.

S197 is the same as S168.

In S198, whether the same subject is tracked before and after the half-press is determined when the release button is half-pressed. If the same subject is continuously tracked before and after the half-press, the process proceeds to S199, and if not, the process proceeds to S205. A specific method of tracking the subject is arbitrary. For example, a method described in an eighth embodiment described below can be applied, or a technique of so-called tracking AF can be applied, in which contrast information of the subject is detected to track the moving subject and then the detection area of the AF is moved according to the movement.

S199 to S204 are the same as S170 to S175. However, the AF area of S203 and S204 is a normal AF area (such as a rectangle with predetermined size around the screen center).

S205 is the same as S178. However, the AF area is a normal AF area.

S206 to S209 are the same as S180 to S183.

The processes of FIGS. 16 and 17 calculate the focus predicted position based on the in-focus position related to the subject when the state has turned into the focused state with the CAF and the in-focus position related to the subject when the release button is half-pressed. Utilizing the focus predicted position enables to achieve both of focus accuracy and shortening of time before the start of the objective-imaging.

Eighth Embodiment

Figure 18:
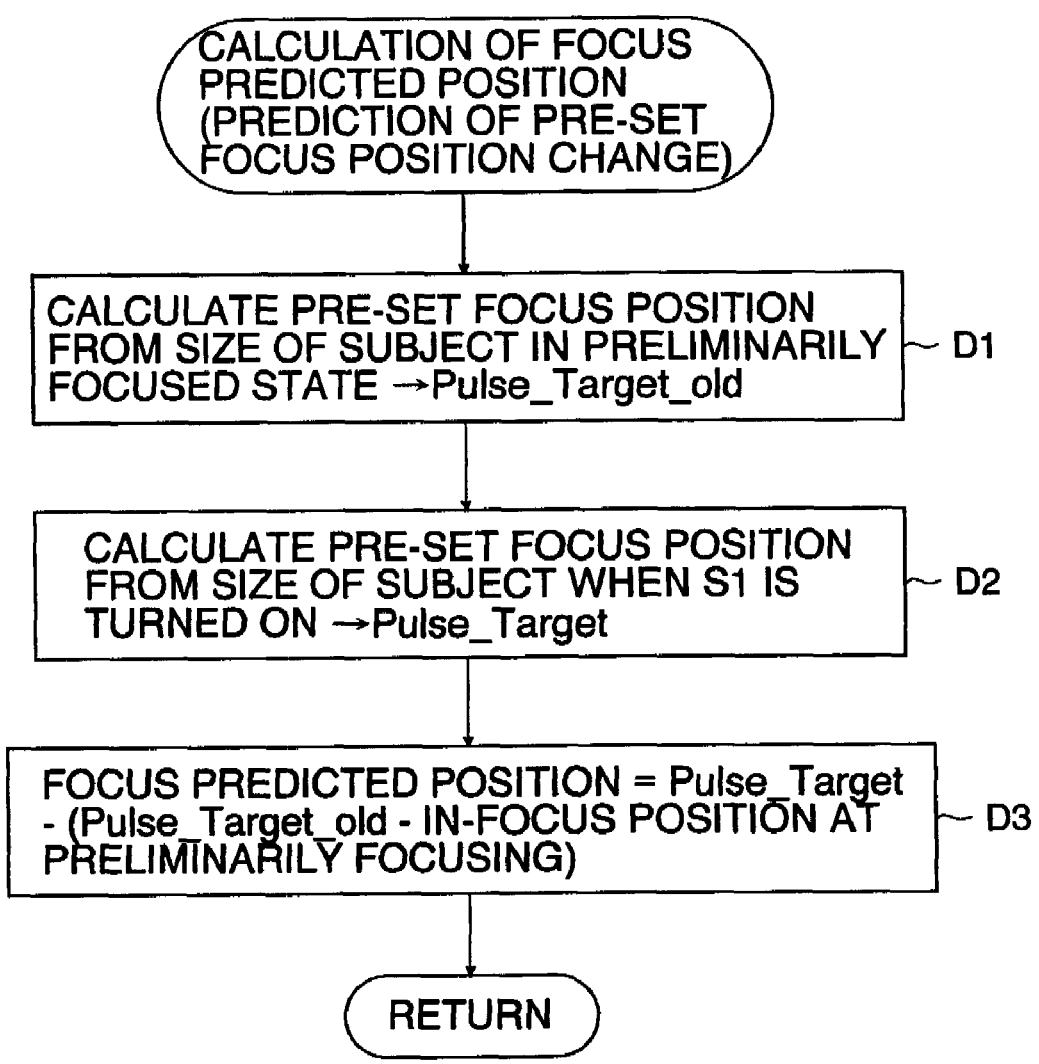
FIG. 18 is a flow chart of focus predicted position calculation.

FIG. 18 is a flow chart of focus predicted position calculation. The process predicts the in-focus position based on a change of a pre-set focus position.

In D1, a pre-set focus position (Pulse_target_old), i.e. a deep focus position, is calculated from the size of the subject when the CAF has turned into the focused state. If the subject is a face, the deep focus position can be obtained, for example, as described after paragraph 0240 of Japanese Patent Application Laid-Open No. 2007-34261 by the present inventor.

In D2, a pre-set focus position (Pulse_target) is calculated from the size of the subject when the release button is half-pressed. If the subject is a face, the pre-set focus position can be obtained as described above.

In D3, the focus predicted position is calculated based on focus predicted position=Pulse_target−(Pulse_target_old−in-focus position of CAF).

Figure 19A:
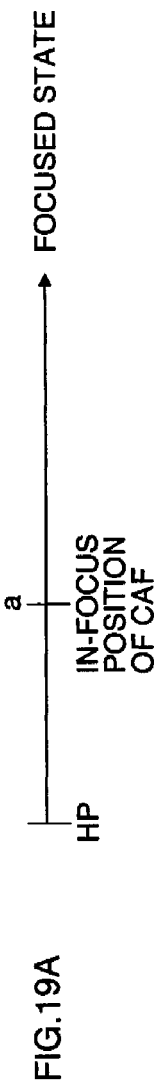
FIGS. 19A, 19B, 19C, and 19D illustrate a pre-set focus position and a focus predicted position.
Figure 19B:
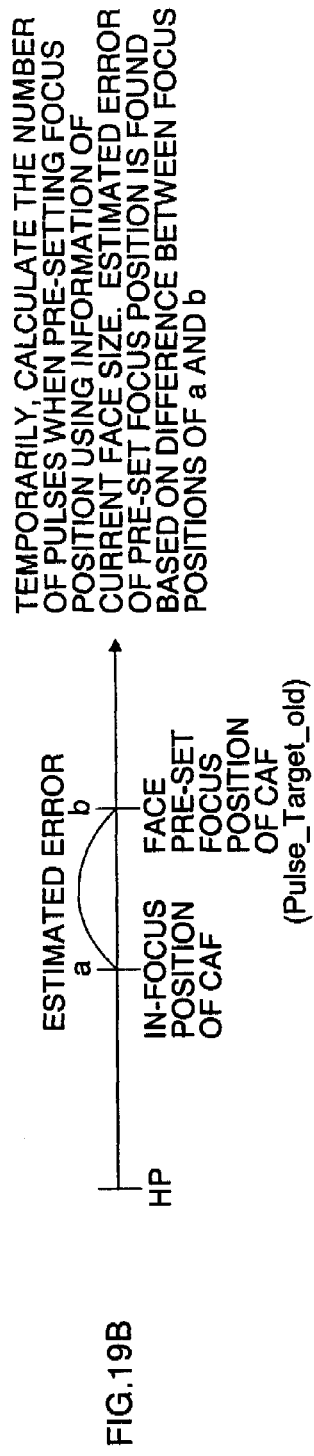
Figure 19C:
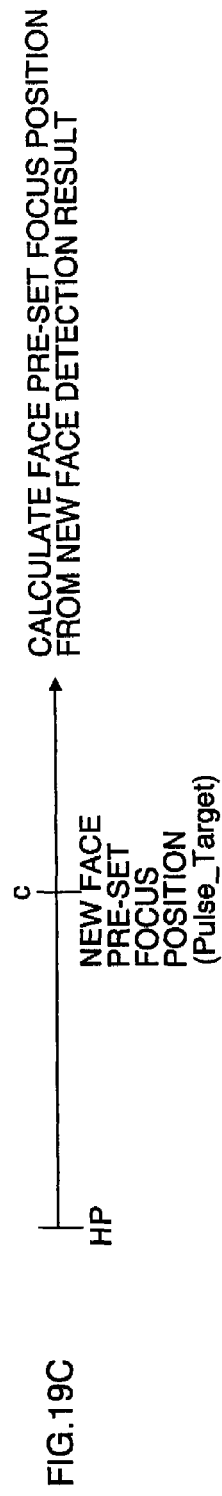
Figure 19D:
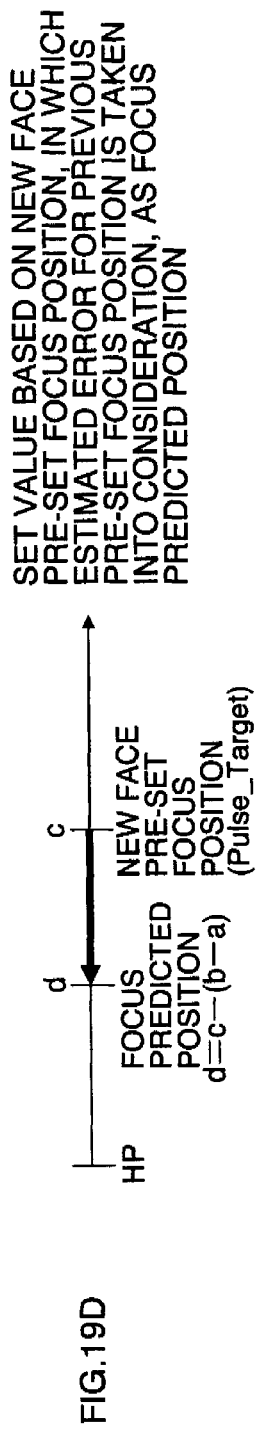

FIG. 19A illustrates a in-focus position when the CAF has turned into the focused state. FIG. 19B illustrates a in-focus position when the CAF has turned into the focused state and a position of a face pre-set focus position (i.e., pre-set focus position for a face) Pulse_target_old at the time when the CAF has turned into the focused state. FIG. 19C illustrates a position of a face pre-set focus position Pulse_target at the time when the release button is half-pressed. FIG. 19D illustrates a focus predicted position when the release button is half-pressed.

The number of drive pulses from the home position (HP) of the focus lens to a pre-set focus position b (Pulse_target_old) is calculated based on the size of the subject, such as the size of the face area, when the CAF has turned into the focused state. An estimated error b−a of the pre-set focus position is obtained based on a difference between the number of drive pulses to the pre-set focus position b and the number of drive pulses to the in-focus position a of the CAF (FIGS. 19A and 19B).

A new face pre-set focus position c after the half-press is then obtained based on a new face detection result after the half-press (FIG. 19C).

A value d=c−(b−a), in which the new face pre-set focus position and the estimated error of the pre-set focus position are taken into consideration, is set as the focus predicted position (FIG. 19D).

Although the size of the face area has been described as an example of the size of the subject, there is no need to limit to the face area. The focus predicted position can be calculated in the same way not with the face area, as long as the relationship between the information of the size of a specific subject and the distance or the amount of focus driving is figured out. Thus, the essence of the prediction of the in-focus position is the error between the pre-set focus position and the in-focus position in the CAF focused state as well as the pre-set focus position at the time of the half-press of the release button. Therefore, there is no need to make the method of finding the pre-set focus position dependent on the face area.

Ninth Embodiment

The focus predicted position can also be calculated as follows.

Figure 20:
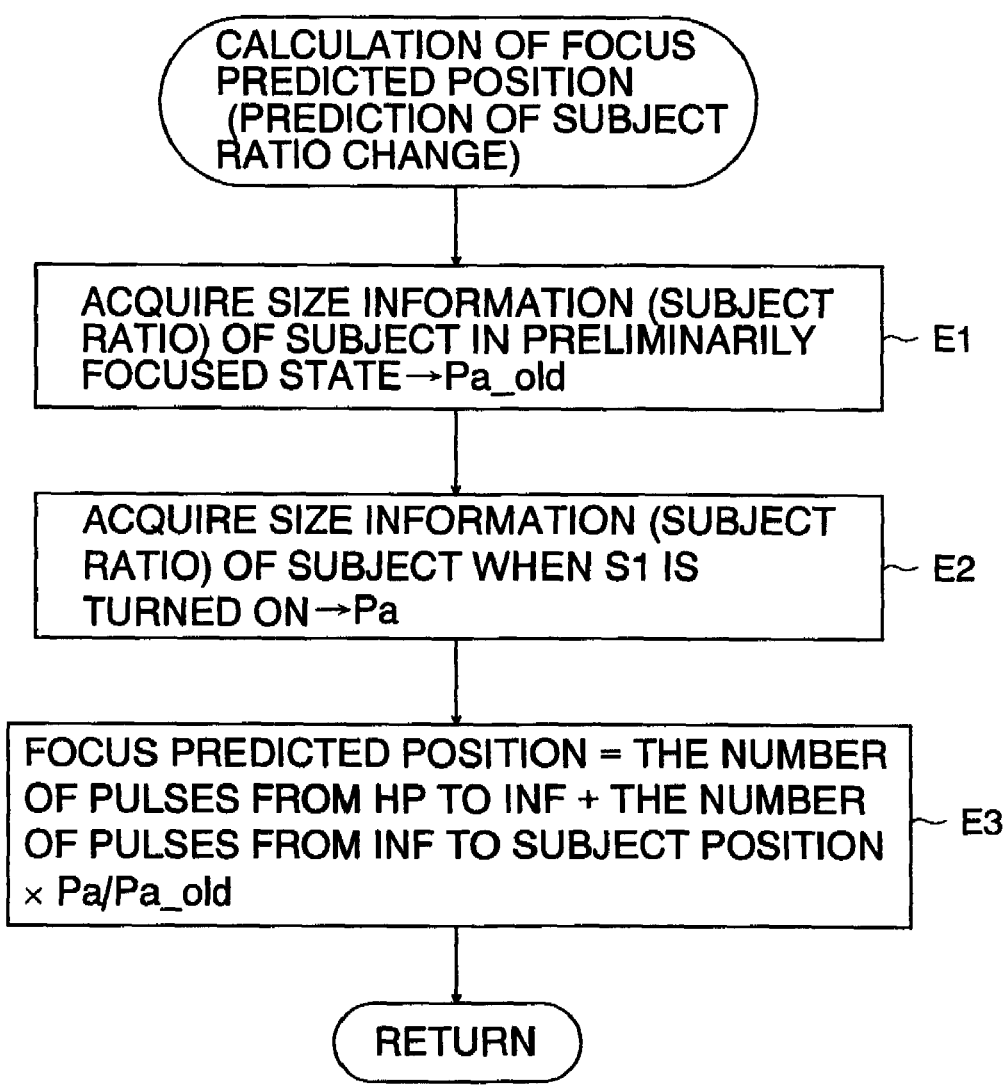
FIG. 20 is a flow chart of the focus predicted position calculation.

FIG. 20 is a flow chart of focus predicted position calculation.

In E1, information Pa_old related to the size of the subject when the CAF has turned into the focused state (for example, proportion of the subject in the longitudinal axis direction on the screen) is acquired from the image data.

In E2, the information Pa related to the size of the subject when the release button is half-pressed is acquired.

In E3, the focus predicted position is calculated based on the following expression.

$$\text{focus predicted position} = $$
$$\text{the number of drive pulses from } HP \text{ to infinity position}(INF) + $$
$$\text{the number of pulses from } INF \text{ to subject position} \times \frac{Pa}{Pa\_old}$$

Figure 21:
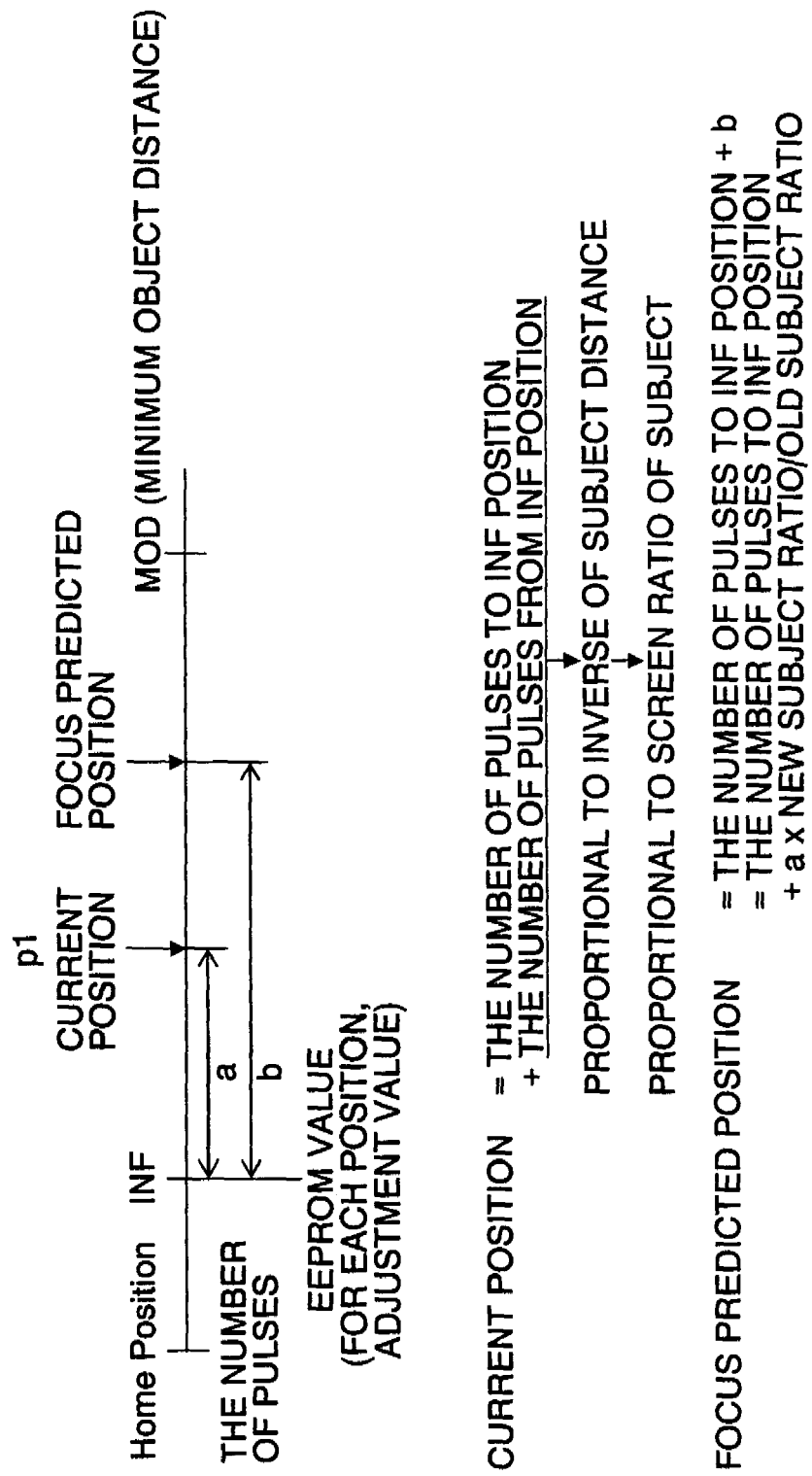
FIG. 21 depicts an example of the number of drive pulses corresponding to a current position of a zoom lens and the focus predicted position.

As shown in FIG. 21, current position of focus lens p1 can be obtained by the sum of the number of drive pulses from HP to INF and the number of drive pulses from INF a. Here, the number of drive pulses from INF a is proportional to the inverse of the subject distance. Considering that the size of the subject is proportional to the subject distance, it can be said that the number of drive pulses from INF a is proportional to the size of the subject. Therefore, it can be said that a value a×Pa/Pa_old, in which the number of drive pulses from INF a is multiplied by a rate of change of the size of the subject Pa/Pa_old, indicates the number of drive pulses from INF to in-focus position p2 after the half-press.

As a result, focus predicted position=the number of drive pulses from HP to INF+the number of pulses from INF to subject position×Pa/Pa_old.

Tenth Embodiment

Figure 22:
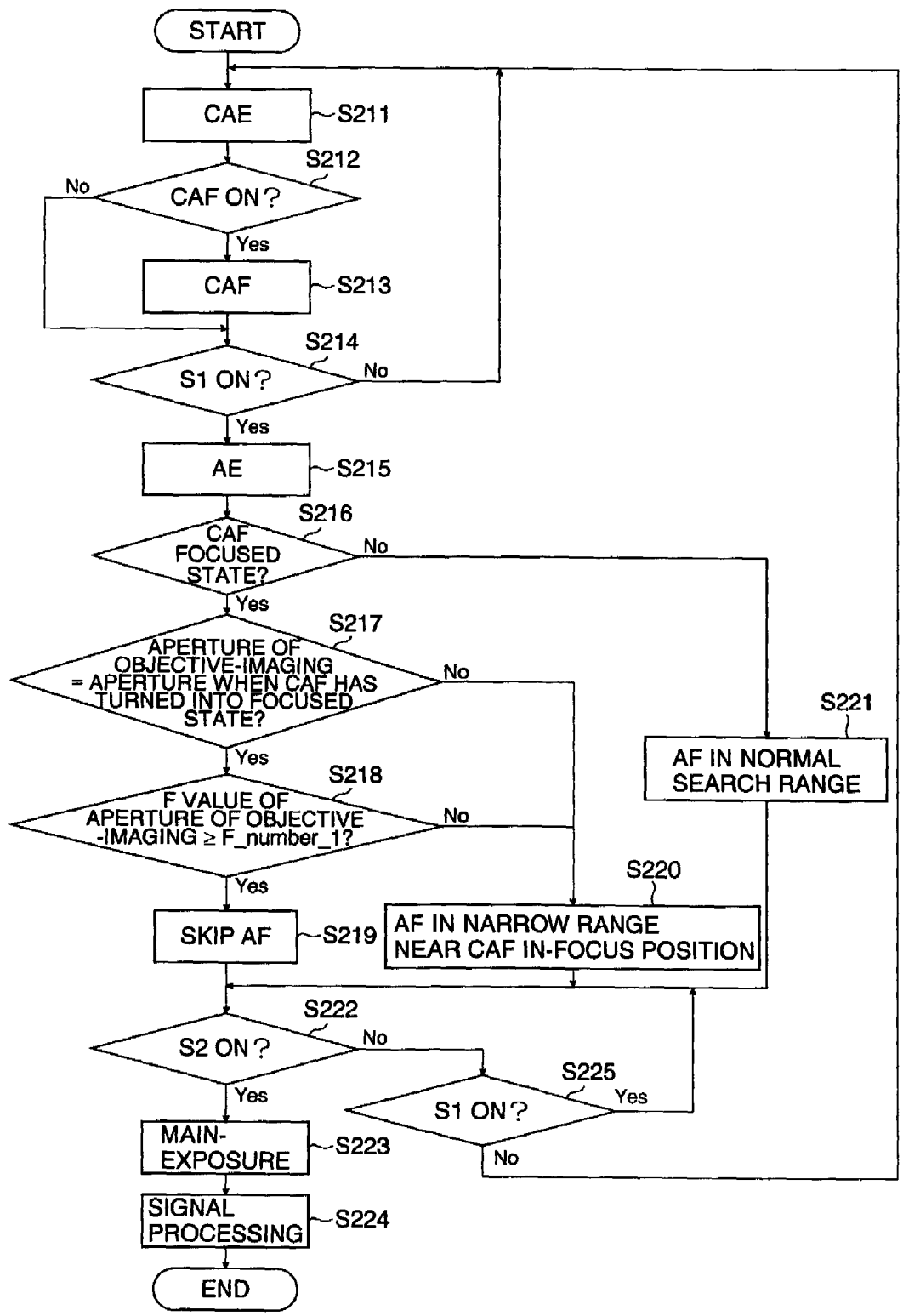
FIG. 22 is a flow chart of a photographing process according to a tenth embodiment.

FIG. 22 is a flow chart of a photographing process according to a tenth embodiment.

S211 to S217 are the same as S1 to S7.

In S218, whether an F value of the aperture of the objective-imaging is equal to or greater than a predetermined F value (F_number_1) is determined. If Yes, the process proceeds to S219. If No, the process proceeds to S220.

S219 to S225 are the same as S8 to S14.

In the present embodiment, attention is focused on the F value of the aperture at the time of the objective-imaging in addition to the relationship between the aperture values. Whether the value is within a reference range set in advance is determined, and whether to skip the AF is determined accordingly. For example, the in-focus position of the CAF and the in-focus position of the AF after the half-press may be different if the pre-imaging AF processing unit 81 and the AF processing unit 62 employ algorithms that are not completely the same for reasons such as the filter characteristics for extracting the contrast components of the image data are different. The in-focus position of the CAF and the in-focus position of the AF after the half-press may also be different if the subject is moving. In such a case, if the F value of the objective-imaging is equal to or greater than a predetermined value F_number_1, the objective-imaging AF is skipped by regarding that the out-of-focus is within a certain degree of tolerance, and if not, the objective-imaging AF is performed in a narrow range.

In this way, the control with the attention focused on the aperture and the F value of the objective-imaging enables to obtain a sufficiently focused image even if there is a possibility that the in-focus position changes between the CAF and the AF after the half-press.

Eleventh Embodiment

Figure 23:
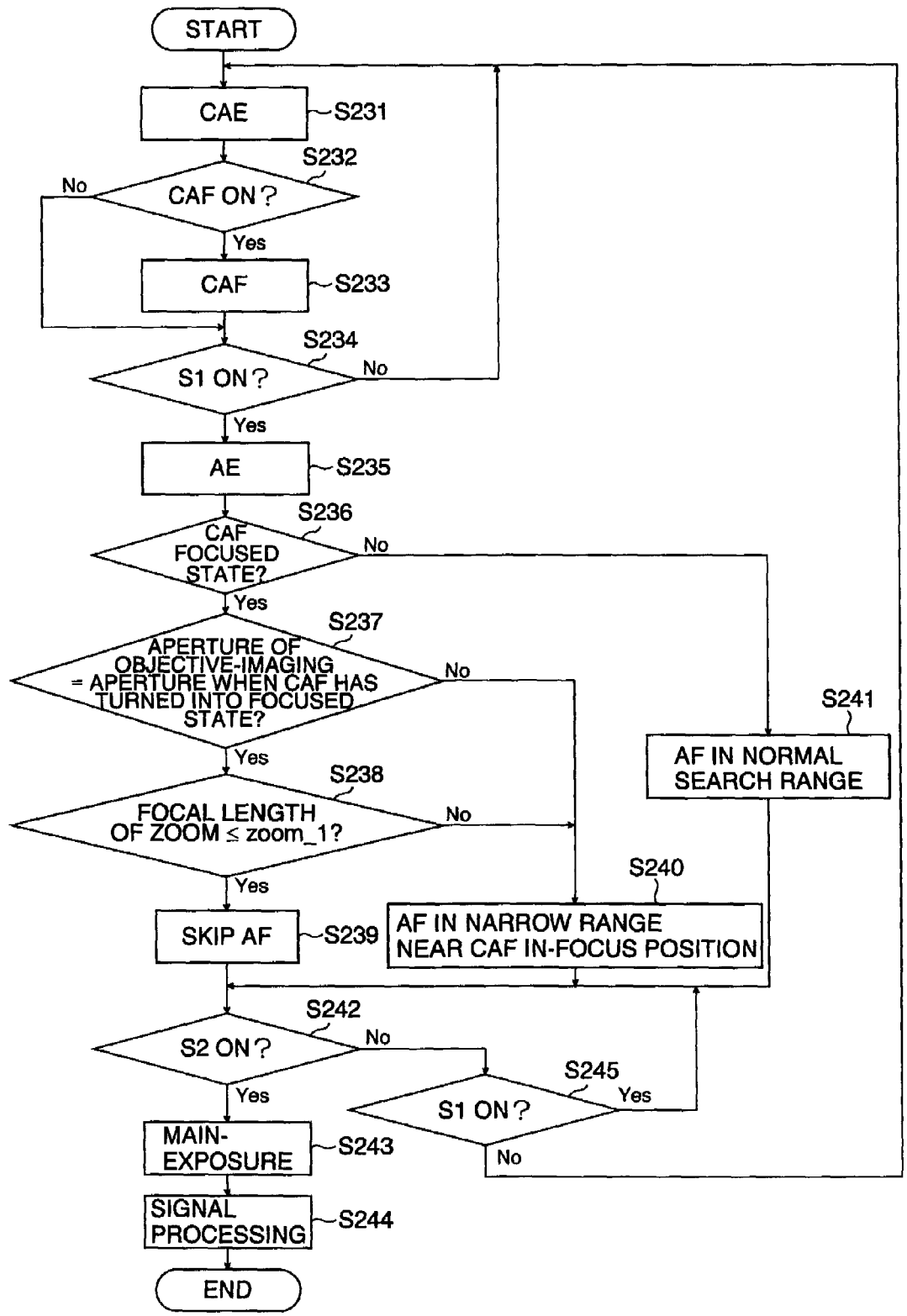
FIG. 23 is a flow chart of a photographing process according to an eleventh embodiment.

FIG. 23 is a flow chart of a photographing process according to an eleventh embodiment.

S231 to S237 are the same as S1 to S7.

In S238, whether a focal length of the zoom of the objective-imaging is equal to or less than a predetermined focal length (zoom_1)(i.e. on the wide angle side) is determined. If Yes, the process proceeds to S239. If No, the process proceeds to S240.

S239 to S245 are the same as S8 to S14.

In the present embodiment, the attention is focused on the zoom position at the time of the objective-imaging in addition to the relationship between the aperture values. Whether the value of the zoom position is within a reference range set in advance is determined, and whether to skip the AF is determined accordingly. For example, the in-focus position of the CAF and the in-focus position of the AF after the half-press may be different if the algorithms of the CAF and the AF after the half-press are not completely the same for reasons such as the filter characteristics are different. The in-focus positions may also be different if the subject is moving. In such a case, the AF is skipped if the focal length of the zoom lens of the objective-imaging is equal to or greater than a predetermined value zoom_1, and if not, the AF is performed in a narrow range. This is because if the focal length of the zoom lens is on the wide angle side, the subject is closely photographed, and the out-of-focus is inconspicuous.

In this way, the control with the attention focused on the aperture and the zoom position of the objective-imaging enables to obtain a sufficiently focused image even if there is a possibility that the in-focus position changes between the CAF and the AF after the half-press.

Twelfth Embodiment

Figure 24:
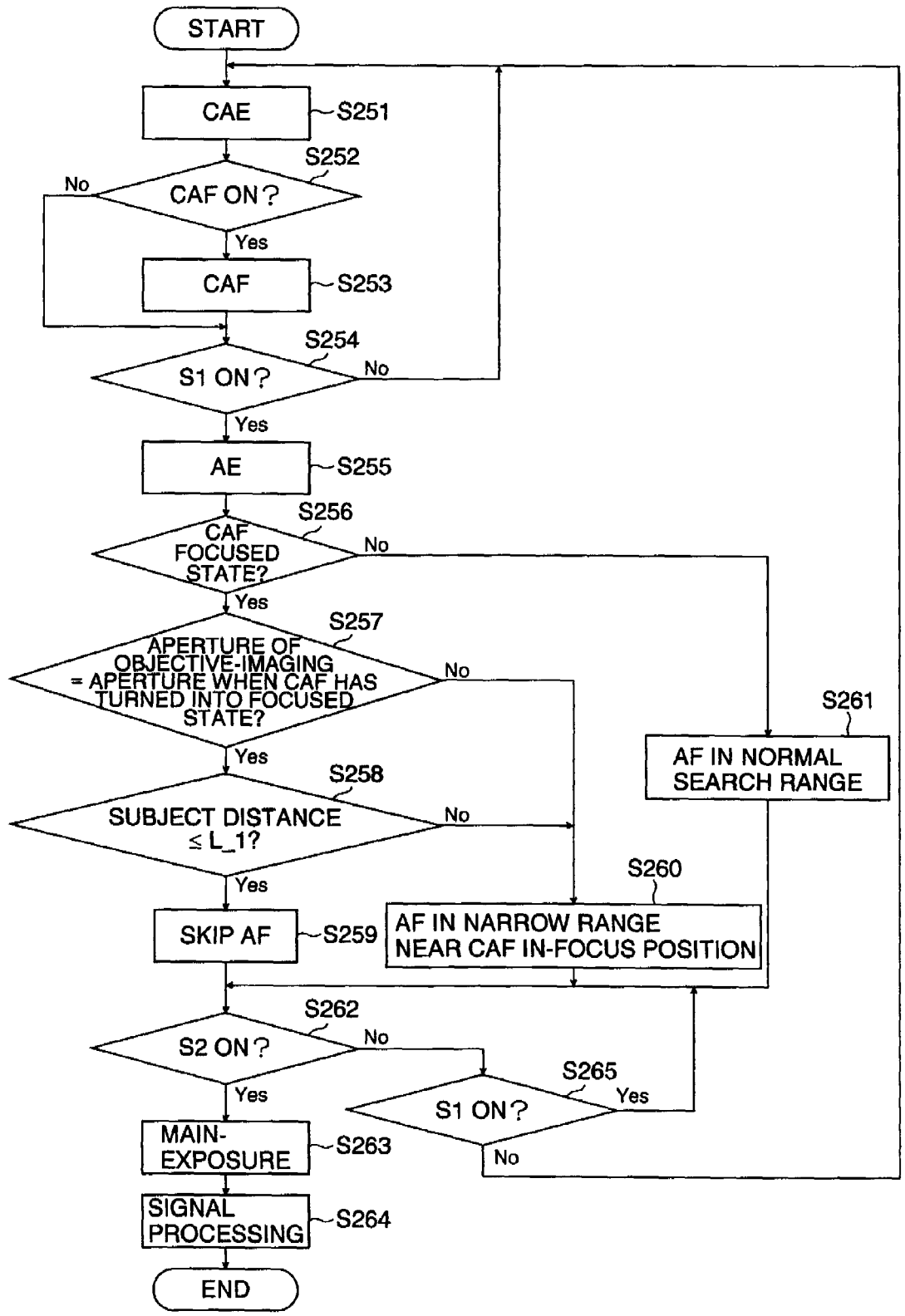
FIG. 24 is a flow chart of a photographing process according to a twelfth embodiment.

FIG. 24 is a flow chart of a photographing process according to a twelfth embodiment.

S251 to S257 are the same as S1 to S7.

In S258, whether the subject distance at the time of the objective-imaging is equal to or less than a predetermined subject distance (L_1)(i.e. near side) is determined. If Yes, the process proceeds to S259. If No, the process proceeds to S260.

S259 to S265 are the same as S8 to S14.

In the present embodiment, the attention is focused on the subject distance at the time of the objective-imaging in addition to the relationship between the aperture values. Whether the value of the subject distance is within a reference range set in advance is determined and, whether to skip the AF is determined accordingly. For example, the in-focus position of the CAF and the in-focus position of the AF after the half-press may be different if the algorithms of the CAF and the AF after the half-press are not completely the same for reasons such as the filter characteristics are different. The in-focus positions may also be different if the subject is moving. In such a case, the AF is skipped if the subject distance at the time of the objective-imaging is equal to or greater than a predetermined value L_1, and if not, the AF is performed in a narrow range. This is because the out-of-focus is inconspicuous if the subject is close.

In this way, the control with the attention focused on the aperture and the subject distance of the objective-imaging enables to obtain a sufficiently focused image even if there is a possibility that the in-focus position changes between the CAF and the AF after the half-press.

Thirteenth Embodiment

Figure 25:
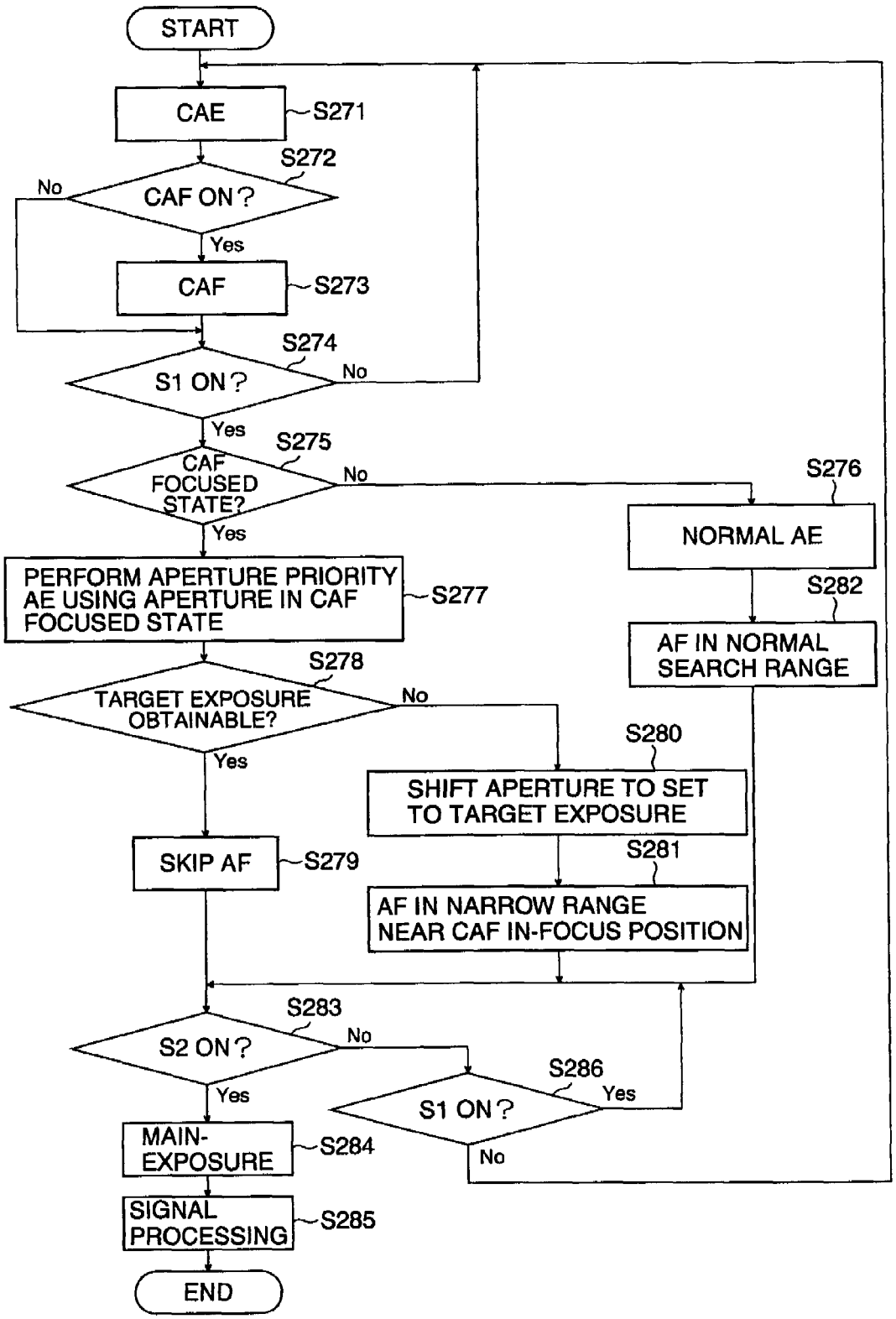
FIG. 25 is a flow chart of a photographing process according to a thirteenth embodiment.

FIG. 25 is a flow chart of a photographing process according to a thirteenth embodiment.

S271 to S274 and S275 are the same as S1 to S4 and S6, respectively.

In S276, the AE/AWB processing unit 63 performs the AE.

In S277, an aperture priority AE is performed using the aperture when the state has turned into the focused state with the CAF. Thus, the AE is performed while the aperture value when the state has turned into the focused state with the CAF is fixed.

In S278, whether an exposure of the control target can be obtained in the aperture priority AE is determined. If Yes, the process proceeds to S279. If No, the process proceeds to S280.

S279 is the same as S8.

In S280, the aperture value is shifted and set to the target exposure.

S281 to S286 are the same as S9 to S14.

Fourteenth Embodiment

Figure 26:
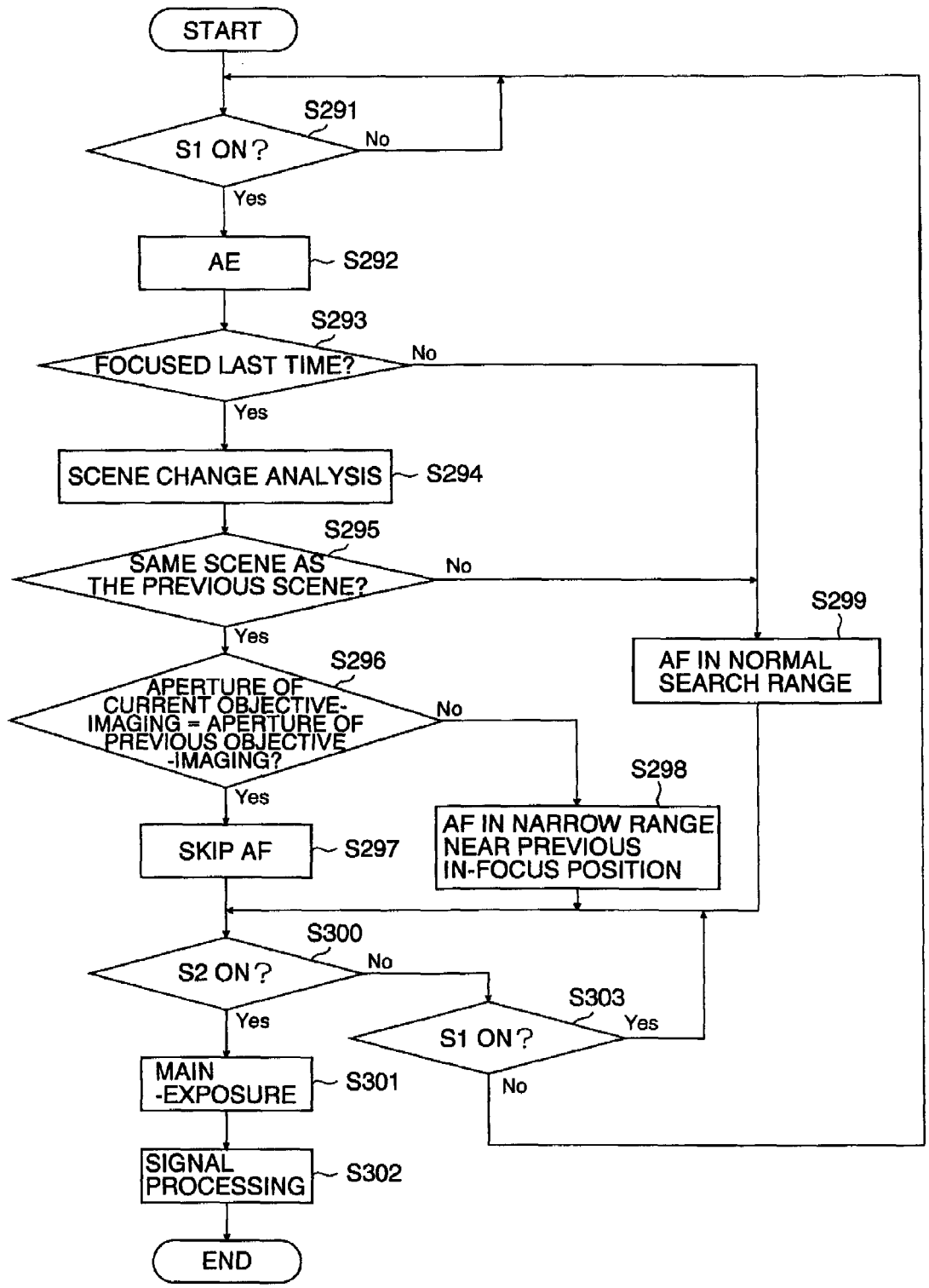
FIG. 26 is a flow chart of a photographing process according to a fourteenth embodiment.

FIG. 26 is a flow chart of a photographing process according to a fourteenth embodiment.

In S291, whether the release button is half-pressed is determined. If the release button is half-pressed, the process proceeds to S292.

In S292, an AE before the objective-imaging is performed.

In S293, whether the focusing has succeeded at least once in the at least one objective-imaging in the past is determined. Hereinafter, whether the focusing has succeeded in the previous objective-imaging will be determined to simplify the description. However, there is no need to limit to the determination based on one objective-imaging in the past, and the determination may also be made based on one or more older objective-imaging. If Yes, the process proceeds to S294. If No, the process proceeds to S299.

In S294, a scene change analysis is performed. The process will be described in detail below.

In S295, whether the current scene is the same scene as in the objective-imaging in the past (previous objective-imaging) when the focusing was successful is determined based on the result of the scene change analysis. If Yes, the process proceeds to S296. If No, the process proceeds to S299. A flag indicating whether the scenes are the same or different is set in the scene change analysis described below. Therefore, whether the scenes are the same or different can be determined accordingly.

In S296, whether the aperture used in a successful objective-imaging in the past (previous objective-imaging) is the same as the aperture of the current objective-imaging is determined. If Yes, the process proceeds to S297. If No, the process proceeds to S298.

S297 to S303 are the same as S8 to S14.

Figure 27:
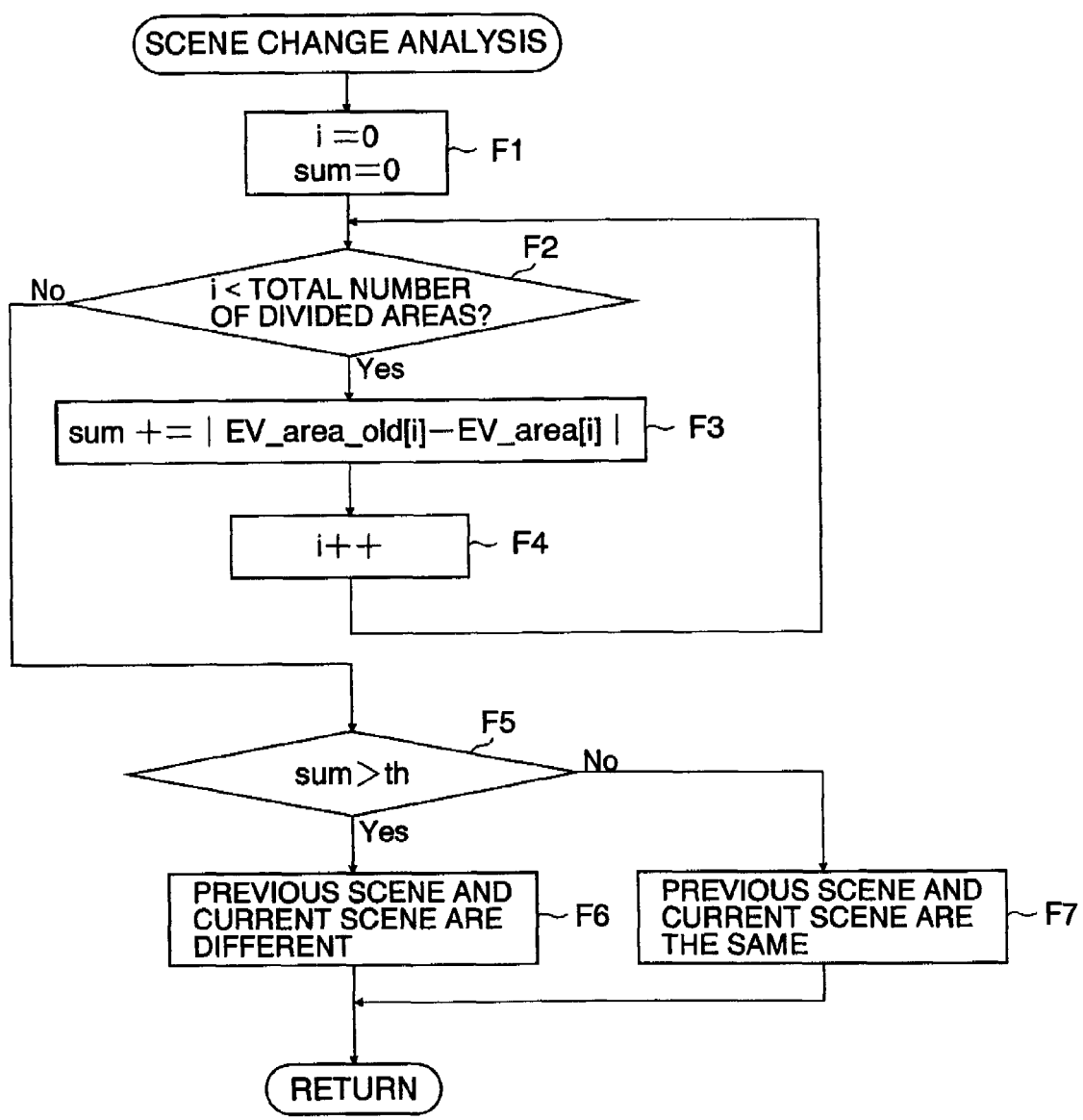
FIG. 27 is a flow chart of a scene change analysis.

FIG. 27 is a flow chart of the scene change analysis.

In F1, i=0 and sum=0 are set.

In F2, whether i is smaller than total number of divided areas is determined. The total number of divided areas is the total number of small areas obtained by dividing, by a predetermined unit, the image data of one screen obtained in the previous objective-imaging and after the current half-press of the release button. For example, in FIG. 28, the previous image data of one screen (FIG. 28A) and the current image data (FIG. 28B) are divided into 3×4 small areas, and the total number of divided areas is 12.

In F3, sum=sum+Σ(i)|EV_area_old[i]−EV_area[i]| is set. More specifically, an absolute value of the difference between an EV value of a small area of the previous image data and a photometric value (EV value) of the small area of the current image data is added for each small area corresponding to the subscript i to form "sum". For example, if i=1, "sum" is an absolute value of the difference between the EV values of first small areas. If i=2, "sum" is a value in which an absolute value of the difference between the first small areas and an absolute value of the difference between second small areas are added. There is no need to limit the type of value to be added to the EV value. A color distribution, a histogram, or an AF evaluation value may also be used.

In F4, i is incremented.

In F5, whether sum is greater than th (predetermined threshold) is determined (i.e., sum>th). If Yes, the process proceeds to F6. If No, the process proceeds to F7.

In F6, a flag indicating that the previous scene and the current scene are different is set.

In F7, a flag indicating that the previous scene and the current scene are the same is set.

That is, the scenes are determined to be the same if the sum of the absolute values of the differences in the EV values in the corresponding small areas is within a certain degree.

If necessary, the positions of the zoom lens and the focus lens in focused state are stored in the ROM 68 before the previous (last) power-off, the zoom lens position and the focus lens position stored in the ROM 68 are read out upon the power-on of the next time or upon the photographing mode setting, the lenses 20 are directly moved to the positions, and then the above-described process is performed.

In that case, the determination of S293 is "Yes", and the determination of the sameness of the scenes (S295) can be performed both before the previous power-off and after the current power-on. The AF can be skipped if the scene before the previous power-off and the scene after the current power-on are the same.

The time from the previous power-off to the current power-on may be timed with a timer, and the zoom lens position and the focus lens position before the previous power-off may be read out from the ROM 68 if the time is within a predetermined threshold (for example, 10 minutes). This is because the photographic scene is completely changed when a certain amount of time has passed and it is likely that the determination of the sameness of the scenes is useless.

What is claimed is:

1. An imaging apparatus comprising:
an imaging optical system that forms a subject image on a predetermined imaging plane;
a driving unit that drives the imaging optical system to change a focal position;
an imaging unit that photoelectrically converts the subject image formed on the imaging plane to output an image signal;
an aperture that adjusts an amount of light entering the imaging unit;
a generating unit that generates image data based on the image signal outputted from the imaging unit;
an operating unit that accepts input of an imaging preparation instruction and an objective-imaging instruction;
a pre-imaging AF unit that detects a in-focus position of the subject image before the imaging preparation instruction is inputted;
a pre-imaging AE unit that determines a target light exposure of the imaging unit before the imaging preparation instruction is inputted;
an objective-imaging AF unit that detects the in-focus position of the subject image after the imaging preparation instruction is inputted;
an objective-imaging AE unit that determines the target light exposure of the imaging unit after the imaging preparation instruction is inputted; and
an imaging control unit that performs:
before the imaging preparation instruction is inputted, a first control of setting the focal position of the imaging optical system to the in-focus position detected by the pre-imaging AF unit and of setting the opening size of the aperture based on the target light exposure determined by the pre-imaging AE unit;
after the imaging preparation instruction is inputted, a second control of setting the focal position of the imaging optical system to the in-focus position detected by the objective-imaging AF unit and of setting the opening size of the aperture based on the target light exposure determined by the objective-imaging AE unit; and
at a point that the imaging preparation instruction is inputted, a third control of skipping the in-focus position detection by the objective-imaging AF unit depending on whether the focal position of the imaging optical system is set to the in-focus position detected by the pre-imaging AF unit and whether the opening size of the aperture that should be set based on the target light exposure of the objective-imaging AE unit is substantially the same as the opening size of the aperture set based on the target light exposure of the pre-imaging AE unit.

2. An imaging apparatus comprising:
an imaging optical system that forms a subject image on a predetermined imaging plane;
a driving unit that drives the imaging optical system to change a focal position;
an imaging unit that photoelectrically converts the subject image formed on the imaging plane to output an image signal;
an aperture that adjusts an amount of light entering the imaging unit;
a generating unit that generates image data based on the image signal outputted from the imaging unit;
an operating unit that accepts input of an imaging preparation instruction and an objective-imaging instruction;
a pre-imaging AF unit that detects a in-focus position of the subject image before the imaging preparation instruction is inputted;
a pre-imaging AE unit that determines a target light exposure of the imaging unit before the imaging preparation instruction is inputted;

an objective-imaging AF unit that detects the in-focus position of the subject image after the imaging preparation instruction is inputted;

an objective-imaging AE unit that determines the target light exposure of the imaging unit after the imaging preparation instruction is inputted; and an imaging control unit that performs:

before the imaging preparation instruction is inputted, a first control of setting the focal position of the imaging optical system to the in-focus position detected by the pre-imaging AF unit and of setting the opening size of the aperture based on the target light exposure determined by the pre-imaging AE unit;

after the imaging preparation instruction is inputted, a second control of setting the focal position of the imaging optical system to the in-focus position detected by the objective-imaging AF unit and of setting the opening size of the aperture based on the target light exposure determined by the objective-imaging AE unit; and at a point that the imaging preparation instruction is inputted, a third control of setting a in-focus position detection range of the objective-imaging AF unit near the in-focus position detected by the pre-imaging AF unit depending on whether the focal position of the imaging optical system is set to the in-focus position detected by the pre-imaging AF unit and whether the opening size of the aperture that should be set based on the target light exposure of the objective-imaging AE unit is substantially different from the opening size of the aperture set based on the target light exposure of the pre-imaging AE unit.

3. The imaging apparatus according to claim 1, further comprising a selecting unit that accepts a selection for prioritizing speed of the objective-imaging or for prioritizing focus accuracy of the objective-imaging, wherein at the point that the imaging preparation instruction is inputted, when the focal position of the imaging optical system is set to the in-focus position detected by the pre-imaging AF unit and the opening size of the aperture set at the point is substantially different from the opening size of the aperture set before the point, the imaging control unit controls to set the in-focus position detection range of the objective-imaging AF unit to a first range near the in-focus position detected by the pre-imaging AF unit if the selecting unit accepts the selection for prioritizing the speed of the objective-imaging, and the imaging control unit controls to set the in-focus position detection range of the objective-imaging AF unit to a second range that is near the in-focus position detected by the pre-imaging AF unit and that is wider than the first range if the selecting unit accepts the selection for prioritizing the focus accuracy of the objective-imaging.

4. The imaging apparatus according to claim 1, further comprising an object detecting unit that detects an object in the subject image based on the image data outputted from the generating unit, wherein the imaging control unit determines whether the object detecting unit detects the same object before and after the imaging preparation instruction and performs the third control when determining that the object detecting unit detects the same object before and after the imaging preparation instruction.

5. The imaging apparatus according to claim 1, further comprising:

an object detecting unit that detects an object in the subject image based on the image data outputted from the generating unit; and a distance calculating unit that calculates a distance to the object detected by the object detecting unit or a in-focus position of the object, wherein the imaging control unit determines whether an absolute value of a difference between the distance or the in-focus position calculated after the imaging preparation instruction and the distance or the in-focus position calculated before the imaging preparation instruction is less than a predetermined threshold and performs the third control when determining that the absolute value of the difference is less than the predetermined threshold.

6. The imaging apparatus according to claim 5, wherein the distance calculating unit calculates the distance to the object or the in-focus position after the imaging preparation instruction based on a relationship between a size of the object detected by the subject detecting unit before the imaging preparation instruction, and the distance to the objet calculated before the imaging preparation instruction or the in-focus position detected by the pre-imaging AF unit before the imaging preparation instruction.

7. The imaging apparatus according to claim 6, wherein the distance calculating unit calculates the distance or the in-focus position after the imaging preparation instruction based on a ratio of the sizes of the objects detected by the object detecting unit before and after the imaging preparation instruction.

8. The imaging apparatus according to claim 1, wherein the imaging control unit performs the third control according to an aperture value corresponding to the target light exposure determined by the objective-imaging AE unit.

9. The imaging apparatus according to claim 1, wherein the imaging control unit performs the third control according to a focal length of a zoom lens of the imaging optical system when the imaging optical system is set to the in-focus position detected by the pre-imaging AF unit.

10. The imaging apparatus according to claim 1, wherein the imaging control unit performs the third control according to a distance to the subject when the imaging optical system is set to the in-focus position detected by the pre-imaging AF unit.

11. The imaging apparatus according to claim 1, wherein the pre-imaging AF unit sets a desired first focus evaluation value calculating area in an imaging range of the imaging unit and calculates a focus evaluation value based on image data corresponding to the first focus evaluation value calculating area among the image data continuously outputted from the generating unit to continuously detect the in-focus position of the subject image according to a local maximum value of the focus evaluation value.

12. The imaging apparatus according to claim 11, wherein the objective-imaging AF unit sets a desired second focus evaluation value calculating area in the imaging range of the imaging unit and calculates a focus evaluation value based on image data corresponding to the second focus evaluation value calculating area among the image data outputted from the generating unit to detect the in-focus position of the subject image according to a local maximum value of the focus evaluation value.

13. The imaging apparatus according to claim 12, wherein the imaging control unit performs the third control if the first focus evaluation value calculating area and the second focus evaluation value calculating area are the same.

14. The imaging apparatus according to claim 1, wherein the pre-imaging AF unit identifies the in-focus position previously detected by the objective-imaging AF unit as the in-focus position of the current objective-imaging if an objective-imaging instruction is inputted at least once before the current objective-imaging instruction is inputted and if an imaging scene when an objective-imaging instruction is previously inputted and an imaging scene when the current objective-imaging instruction is inputted are the same.

15. The imaging apparatus according to claim 1, wherein the pre-imaging AE unit continuously determines the target light exposure of the imaging unit according to a subject brightness obtained based on the image data continuously outputted from the generating unit.

16. The imaging apparatus according to claim 1, wherein the objective-imaging AE unit sets the aperture value of the objective-imaging to the same value as the aperture value determined by the pre-imaging AE unit at the point that the imaging preparation instruction is inputted when the focal position of the imaging optical system is set to the in-focus position detected by the pre-imaging AF unit at the point that the imaging preparation instruction is inputted.

17. An imaging method of an imaging apparatus including: an imaging optical system that forms a subject image on a predetermined imaging plane; a driving unit that drives the imaging optical system to change a focal position; an imaging unit that photoelectrically converts the subject image formed on the imaging plane to output an image signal; an aperture that adjusts an amount of light entering the imaging unit; a generating unit that generates image data based on the image signal outputted from the imaging unit; an operating unit that accepts input of an imaging preparation instruction and an objective-imaging instruction; a pre-imaging AF unit that detects a in-focus position of the subject image before the imaging preparation instruction is inputted; a pre-imaging AE unit that determines a target light exposure of the imaging unit before the imaging preparation instruction is inputted; an objective-imaging AF unit that detects the in-focus position of the subject image after the imaging preparation instruction is inputted; and an objective-imaging AE unit that determines the target light exposure of the imaging unit after the imaging preparation instruction is inputted, the imaging method comprising:
    before the imaging preparation instruction is inputted, a first control step of setting the focal position of the imaging optical system to the in-focus position detected by the pre-imaging AF unit and of setting the opening size of the aperture based on the target light exposure determined by the pre-imaging AE unit and that performs;
    after the imaging preparation instruction is inputted, a second control step of setting the focal position of the imaging optical system to the in-focus position detected by the objective-imaging AF unit and of setting the opening size of the aperture based on the target light exposure determined by the objective-imaging AE unit; and
    at a point that the imaging preparation instruction is inputted, a third control step of skipping the in-focus position detection by the objective-imaging AF unit depending on whether the focal position of the imaging optical system is set to the in-focus position detected by the pre-imaging AF unit and whether the opening size of the aperture that should be set based on the target light exposure of the objective-imaging AE unit is substantially the same as the opening size of the aperture set based on the target light exposure of the pre-imaging AE unit.

18. An imaging method of an imaging apparatus including: an imaging optical system that forms a subject image on a predetermined imaging plane; a driving unit that drives the imaging optical system to change a focal position; an imaging unit that photoelectrically converts the subject image formed on the imaging plane to output an image signal; an aperture that adjusts an amount of light entering the imaging unit; a generating unit that generates image data based on the image signal outputted from the imaging unit; an operating unit that accepts input of an imaging preparation instruction and an objective-imaging instruction; a pre-imaging AF unit that detects a in-focus position of the subject image before the imaging preparation instruction is inputted; a pre-imaging AE unit that determines a target light exposure of the imaging unit before the imaging preparation instruction is inputted; an objective-imaging AF unit that detects the in-focus position of the subject image after the imaging preparation instruction is inputted; and an objective-imaging AE unit that determines the target light exposure of the imaging unit after the imaging preparation instruction is inputted, the imaging method comprising:
    before the imaging preparation instruction is inputted, a first control step of setting the focal position of the imaging optical system to the in-focus position detected by the pre-imaging AF unit and of setting the opening size of the aperture based on the target light exposure determined by the pre-imaging AE unit;
    after the imaging preparation instruction is inputted, a second control step of setting the focal position of the imaging optical system to the in-focus position detected by the objective-imaging AF unit and of setting the opening size of the aperture based on the target light exposure determined by the objective-imaging AE unit; and
    at a point that the imaging preparation instruction is inputted, a third control step of setting a in-focus position detection range of the objective-imaging AF unit near the in-focus position detected by the pre-imaging AF unit depending on whether the focal position of the imaging optical system is set to the in-focus position detected by the pre-imaging AF unit and whether the opening size of the aperture that should be set based on the target light exposure of the objective-imaging AE unit is substantially different from the opening size of the aperture set based on the target light exposure of the pre-imaging AE unit.

19. The imaging method according to claim 17, further comprising:
    accepting a selection for prioritizing speed of the objective-imaging or for prioritizing the focus accuracy of the objective-imaging; and
    at the point that the imaging preparation instruction is inputted, when the focal position of the imaging optical system is set to the in-focus position detected by the pre-imaging AF unit and the opening size of the aperture set at the point is substantially different from the opening size of the aperture set before the point,
        setting the in-focus position detection range of the objective-imaging AF unit to a first range near the in-focus position detected by the pre-imaging AF unit if the selection for prioritizing the speed of the objective-imaging is accepted, and setting the in-focus position detection range of the objective-imaging AF unit to a second range that is near the in-focus position detected by the pre-imaging AF unit and that is wider than the first range if the selection for prioritizing the focus accuracy of the objective-imaging is accepted.

20. The imaging method according to claim 17, further comprising:
    detecting an object in the subject image based on the image data outputted from the generating unit; and
    determining whether the same object is detected before and after the imaging preparation instruction and performing the third control step if determining that the same object is detected before and after the imaging preparation instruction.

21. The imaging method according to claim 17, further comprising:
    detecting an object in the subject image based on the image data outputted from the generating unit;
    calculating a distance to the detected object or a in-focus position of the object; and
    determining whether an absolute value of a difference between the distance or the in-focus position calculated after the imaging preparation instruction and the distance or the in-focus position calculated before the imaging preparation instruction is less than a predetermined threshold and performing the third control step when determining that the absolute value of the difference is less than the predetermined threshold.

22. The imaging method according to claim 21, further comprising
    calculating the distance to the object or the in-focus position after the imaging preparation instruction based on a relationship between a size of the object detected before the imaging preparation instruction and the distance to the objet calculated before the imaging preparation instruction or the in-focus position detected by the pre-imaging AF unit before the imaging preparation instruction.

23. The imaging method according to claim 22, further comprising
    calculating the distance or the in-focus position after the imaging preparation instruction based on a ratio of the sizes of the objects detected before and after the imaging preparation instruction.

24. The imaging method according to claim 17, further comprising
    performing the third control step according to an aperture value corresponding to the target light exposure determined by the objective-imaging AE unit.

25. The imaging method according to claim 17, further comprising
    performing the third control step according to a focal length of a zoom lens of the imaging optical system when the imaging optical system is set to the in-focus position detected by the pre-imaging AF unit.

26. The imaging method according to claim 17, further comprising
    performing the third control step according to a distance to the subject when the imaging optical system is set to the in-focus position detected by the pre-imaging AF unit.

27. The imaging method according to claim 17, further comprising,
    in the pre-imaging AF unit, setting a desired first focus evaluation value calculating area in an imaging range of the imaging unit and calculating a focus evaluation value based on image data corresponding to the first focus evaluation value calculating area among the image data continuously outputted from the generating unit to continuously detect the in-focus position of the subject image according to a local maximum value of the focus evaluation value.

28. The imaging method according to claim 27, further comprising,
    in the objective-imaging AF unit, setting a desired second focus evaluation value calculating area in the imaging range of the imaging unit and calculating a focus evaluation value based on image data corresponding to the second focus evaluation value calculating area among the image data outputted from the generating unit to detect the in-focus position of the subject image according to a local maximum value of the focus evaluation value.

29. The imaging method according to claim 28, further comprising
    performing the third control step if the first focus evaluation value calculating area and the second focus evaluation value calculating area are the same.

30. The imaging method according to claim 17, further comprising,
    in the pre-imaging AF unit, identifying the in-focus position previously detected by the objective-imaging AF unit as the in-focus position of the current objective-imaging if an objective-imaging instruction is inputted at least once before the current objective-imaging instruction is inputted and if an imaging scene when an objective-imaging instruction is previously inputted and an imaging scene when the current objective-imaging instruction is inputted are the same.

31. The imaging method according to claim 17, further comprising,
    in the pre-imaging AE unit, continuously determining the target light exposure of the imaging unit according to a subject brightness obtained based on the image data continuously outputted from the generating unit.

32. The imaging method according to claim 17, further comprising,
    in the objective-imaging AE unit, setting the aperture value of the objective-imaging to the same value as the aperture value determined by the pre-imaging AE unit at the point that the imaging preparation instruction is inputted when the focal position of the imaging optical system is set to the in-focus position detected by the pre-imaging AF unit at the point that the imaging preparation instruction is inputted.

* * * * *